US012741415B2

(12) United States Patent
Schaffner et al.

(10) Patent No.: US 12,741,415 B2
(45) Date of Patent: Sep. 22, 2026

(54) METHOD FOR PREPARING A 3D-PRINTED SILICONE

(71) Applicant: SPECTROPLAST AG, Schlieren (CH)

(72) Inventors: Manuel Schaffner, Schlieren (CH); Petar Stefanov, Schlieren (CH); Akin Gürsoy, Schlieren (CH)

(73) Assignee: SPECTROPLAST AG, Schlieren (CH)

(*) Notice: Subject to any disclaimer, the term of this patent is extended or adjusted under 35 U.S.C. 154(b) by 756 days.

(21) Appl. No.: 18/014,482

(22) PCT Filed: Jul. 9, 2021

(86) PCT No.: PCT/EP2021/069174
§ 371 (c)(1),
(2) Date: Jan. 5, 2023

(87) PCT Pub. No.: WO2022/008721
PCT Pub. Date: Jan. 13, 2022

(65) Prior Publication Data

US 2023/0256670 A1 Aug. 17, 2023

(30) Foreign Application Priority Data

Jul. 10, 2020 (EP) .................................... 20185262

(51) Int. Cl.
*B29C 64/171* (2017.01)
*B29L 31/00* (2006.01)
(Continued)

(52) U.S. Cl.
CPC ............ *B29C 64/171* (2017.08); *B33Y 70/00* (2014.12); *B33Y 80/00* (2014.12); *B29L 2031/7532* (2013.01)

(58) Field of Classification Search
CPC ....... B29C 64/171; B33Y 70/00; B33Y 80/00; B29L 2031/7532; C08L 83/08;
(Continued)

(56) References Cited

U.S. PATENT DOCUMENTS 10,155,884 B2 12/2018 Kenney et al.
11,859,037 B2 * 1/2024 Harumashi ............ C09J 171/02
(Continued)

FOREIGN PATENT DOCUMENTS

EP 0437247 A2 7/1991
EP 1942159 A1 7/2008
(Continued)

OTHER PUBLICATIONS

Office Action for JP Patent Application Serial No. 2022-580866, dated May 21, 2024, in Japanese and English, 8 pages.
(Continued)

*Primary Examiner* — Nahida Sultana
(74) *Attorney, Agent, or Firm* — Lowenstein Sandler LLP

(57) ABSTRACT

A method for preparing a 3D-printed silicone comprising:
a) preparation of a 3D model of a preproduct;
b) additive manufacturing of the preproduct according to the 3D model of the preproduct using an additive manufacturing device and an additive manufacturing composition comprising:
i) at least one silicone building block bearing a plurality of alkenyl groups (A);
ii) at least one crosslinking agent bearing a plurality of thiol groups (B);
iii) at least one free radical photoinitiator (D);
c) post-curing treatment that comprises at least one further curing step other than light-promoted curing, preferably either heat promoted radical curing or silanol condensation curing;

(Continued)

3D printed sample with layer thickness 0.1 mm, radius 5 mm and height 6 mm, prepared as described in the experimental section. Three Shore hardness measurements X1(outer wall), X2 (center), X3 (outer wall) are taken after a) 3D printing and UV post-curing for 20 min, then slicing, with X1 = A45, X2 = A41 and X3 = A46. b) After heat curing at 120 °C for 2 h, with X1 = A61, X2 = A61 and X3 = A61.

wherein the ratio of thiol groups to alkenyl groups in the additive manufacturing composition is in the range from 0.5:1 to 5:1.

13 Claims, 2 Drawing Sheets

(51) Int. Cl.
*B33Y 70/00* (2020.01)
*B33Y 80/00* (2015.01)

(58) Field of Classification Search
CPC ......... C08L 83/04; C08L 83/00; C08G 77/20; C08G 77/28; C08K 5/07
See application file for complete search history.

(56) References Cited

U.S. PATENT DOCUMENTS

2017/0283655 A1 10/2017 Kenney et al.
2020/0123383 A1* 4/2020 Wallin .................... C08L 83/04
2020/0216692 A1 7/2020 Studart et al.
2020/0324464 A1 10/2020 Reese et al.
2021/0009742 A1* 1/2021 Harumashi ............ C09J 201/10

FOREIGN PATENT DOCUMENTS

JP 20100185991 A 5/2012
JP 2018500192 A 1/2018
JP 2020512217 A 4/2020
WO 2013160252 A2 10/2013
WO 2018013779 A1 1/2018
WO WO-2019053258 A1 * 3/2019 ............. C09D 11/52

OTHER PUBLICATIONS

English Translations of Office Action for Japanese Patent Application No. 2022-580866 issued Dec. 12, 2023, 23 pages.
International Search Report and Written Opnion for PCT/EP2021/069174 mailed Oct. 12, 2021, 12 pages.
European Search Report for EP20185262.1 dated Dec. 9, 2020, 6 pages.

* cited by examiner

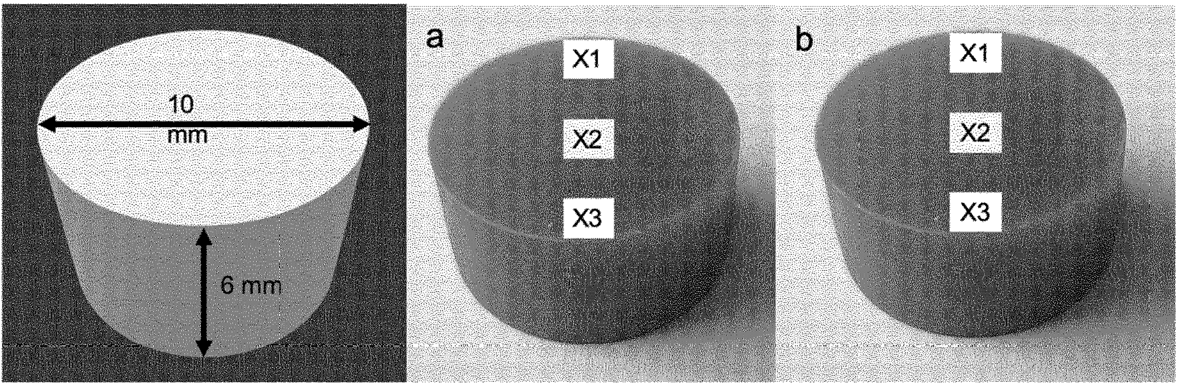

Figure 1: 3D printed sample with layer thickness 0.1 mm, radius 5 mm and height 6 mm, prepared as described in the experimental section. Three Shore hardness measurements X1(outer wall), X2 (center), X3 (outer wall) are taken after a) 3D printing and UV post-curing for 20 min, then slicing, with X1 = A45, X2 = A41 and X3 = A46. b) After heat curing at 120 °C for 2 h, with X1 = A61, X2 = A61 and X3 = A61.

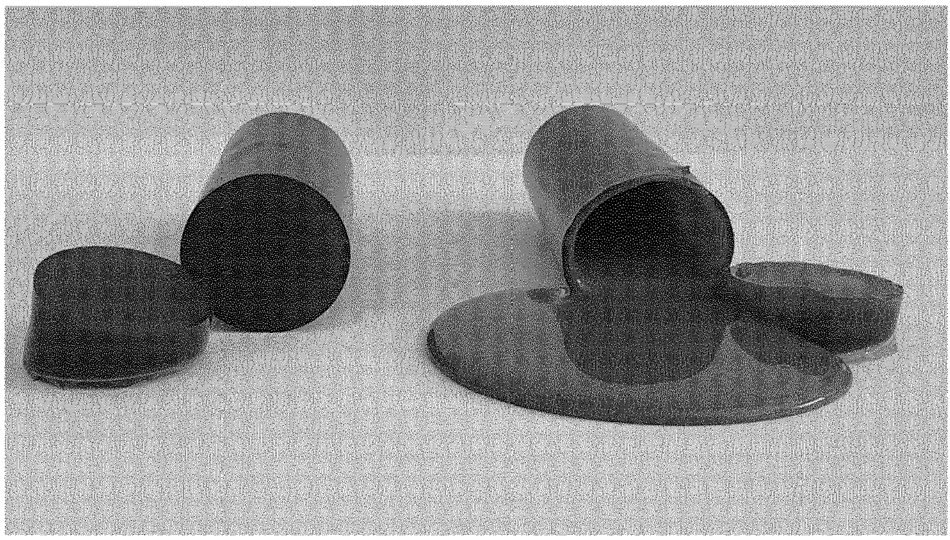

Figure 2: Comparison of depth of cure of UV and Heat cured samples. a) Left; Cured with UV for 20 min and heat cured at 180 °C for 20 min. b) Right; Cured with UV for 20 min. Diameter of the cylinders; 26 mm

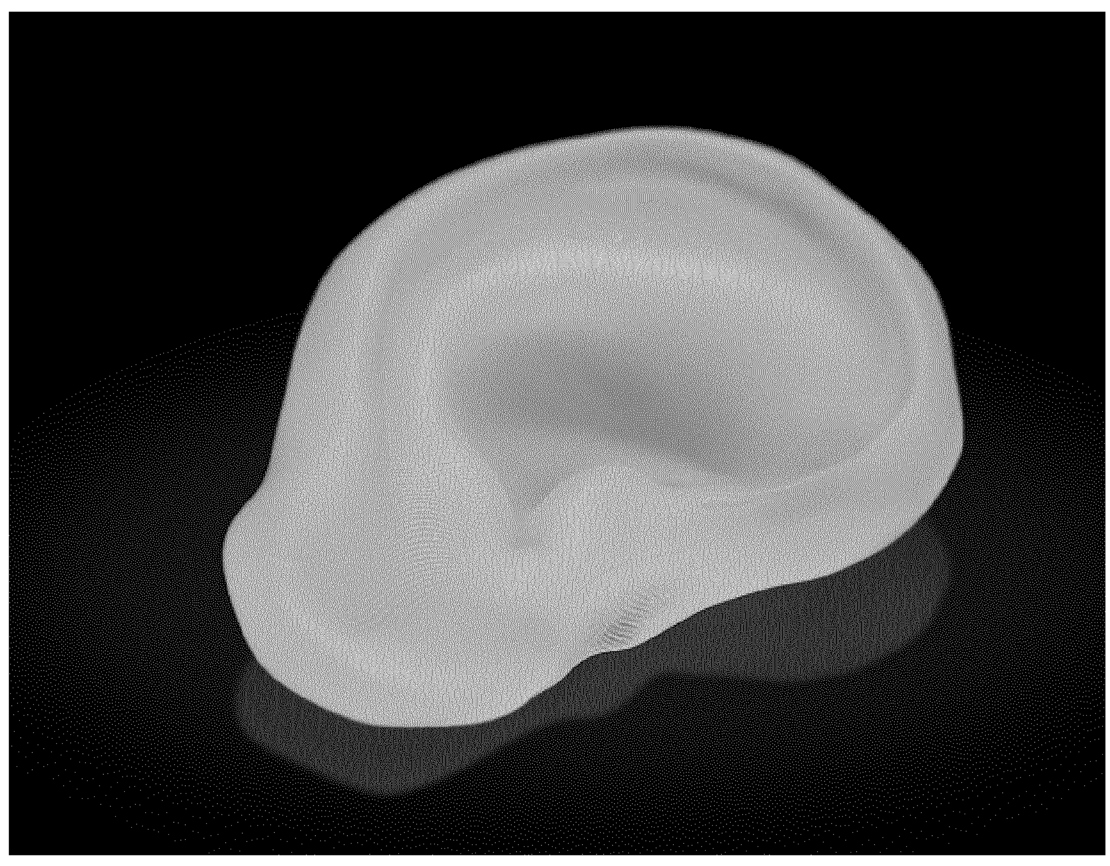
Figure 3: 3D-printed ear-shaped prosthesis, manufactured using composition 3

METHOD FOR PREPARING A 3D-PRINTED SILICONE

CROSS-REFERENCE TO RELATED APPLICATION(S)

The present application is a national stage entry under 35 U.S.C. § 371 of International Application No. PCT/EP2021/069174, filed on Jul. 9, 2021, which claims priority to European Patent Application No. 20185262.1, filed on Jul. 10, 2020. The contents of these applications are hereby incorporated by reference in their entirety.

The present invention relates to a method for preparing a 3D-printed silicone involving a non-light-promoted post-curing treatment step, an additive manufacturing composition for preparing a 3D-printed silicone, 3D-printed silicone articles prepared via the method.

BACKGROUND TO THE INVENTION

Additive manufacturing, also widely known as 3D printing, refers to processes used to create a three-dimensional object by either depositing and solidifying material of various forms (e.g. layer, droplet, etc.) to obtain the entire object in a layer-by-layer or continuous fashion or solidifying the entire volume at the same time to obtain the entire object in full as one part.

A large number of materials, ranging from metals to synthetic resins are available today for additive manufacturing. In one type of additive manufacturing, a layer of a liquid crosslinkable material is deposited according to a predetermined pattern using an apparatus equipped with a nozzle. Examples of such a type of additive manufacturing are 3D printing of elastomers and hydrogels, both of which need to be crosslinked. After deposition of a layer of crosslinkable material (either as one layer or as drops forming a layer), the crosslinkable material is crosslinked by either exposing it for example to radiation, a change in temperature or by contacting it with a chemical crosslinking agent to obtain a self-supporting structure onto which further layers can then be deposited and crosslinked. Alternatively, an object may integrally be formed from the crosslinkable material in a first step and integrally crosslinked in a subsequent step.

Silicones, including polysiloxanes, have so far not been extensively used in the field of additive manufacturing due to several problems inherent to this class of chemical compounds. On one hand, polysiloxanes exhibit high viscosities that make it difficult to accurately dose them, whilst on the other hand, polysiloxanes are crosslinked through a condensation or addition reaction-both cannot be spatially controlled which is imperative to additive manufacturing.

EP 0 437 247 A2 discloses UV curable silicone resin-organic mercaptan compositions, in which a polysiloxane functionalized with at least two aliphatic unsaturated radicals which can react with a mercaptan having two or more mercapto groups as well as a free radical photoinitiator and a free radical inhibitor. The composition is formed by mixing the components of the composition to a transparent compatible mixture and is then cast into different substrates to form a coating.

JP 2010-0185991 A discloses crosslinkable compositions for the manufacturing of microlenses comprising a polysiloxane having an unsaturated bond group, a polysiloxane different from the aforementioned polysiloxane, a mercapto compound, a photoinitiator and an organic solvent for the dissolution of the aforementioned compounds. The composition is applied as film coating to a substrate and crosslinked using radiation and heat.

WO 2013/160252 A2 discloses compositions to form dry silicone gels that can act as crosslinker/chain extender having 2 or more thiol groups, a free radical initiator and a toughening agent such as fumed silica. The compositions can be crosslinked with UV radiation or heat.

WO 2018/013779 A1 discloses a three-dimensional printable ink composition comprising polydimethysiloxane (PDMS) microbeads, a PDMS precursors liquid binding to the microbeads to form a paste-like material and a water phase.

EP 1 942 159 A1 discloses a two-part curable ink composition whereby olefin monomers are polymerized in an ink jet process forming 3D-printed polyolefin compositions.

WO 2019/053258 A1 discloses an additive manufacturing ink comprising a polysiloxane bearing a plurality of alkenyl groups and a crosslinking agent bearing a plurality of thiol groups, wherein the polysiloxane bearing a plurality of alkenyl groups and the crosslinking agent bearing a plurality of thiol groups form an emulsion having beneficial shear thinning characteristics.

Unpublished application CH 3612019 discloses a similar additive manufacturing ink, comprising an alkenyl-derivatized polysiloxane and a cross linking agent being a mercapto-derivatized polysiloxane-based crosslinking agent.

In both of the two previous inventions, the process of additive manufacturing comprises a first step wherein a preproduct is produced via UV-VIS controlled additive manufacturing, followed by post-curing treatment involving UV treatment of the generated preproduct. The post-curing with UV light has the effect of ensuring that all monomer remaining after the additive manufacturing step is reacted to form a final cured product.

Whilst post-curing with light is an efficient process for transparent materials, there remain a number of drawbacks. Firstly, the light has limited penetration through the partially cured preproduct, even more so in a coloured object. In larger 3D-printed silicone structures, for example 1 $cm^3$ or larger, the centre of the preproduct will therefore not be affected by the action of the light. This can affect the properties of the final 3D-printed silicone product, as well as the lifetime of the product if the uncured monomers were to leak from the structure. Furthermore, light curing is a fast process, which freezes existing tension into the molecular networks that are formed in the curing step, which may weaken the material.

There is therefore a need for a method for preparing a 3D-printed silicone product having isotropic mechanical properties as a result of improved post-curing treatment.

Furthermore, there is need for post-curing treatments that can achieve full curing of large preproducts, for example 1 $cm^3$ or larger.

The above problems are addressed in the present application, whereby the use of thermally promoted free radical curing steps and/or silanol condensation curing steps may be used to obtain a 3D-printed silicone product having improved mechanical properties.

SUMMARY OF THE INVENTION

The present invention is based upon the finding that when manufacturing silicone products via additive manufacturing processes, a post-curing step other than light curing, for example either heat promoted radical curing or silanol condensation curing, leads to homogeneous curing throughout the entirety of the 3D-printed silicone product, especially for products of 1 $cm^3$ or large, and thus isotropic mechanical properties.

The present invention is directed to a method for preparing a 3D-printed silicone comprising:

a) preparation of a 3D model of a preproduct;
b) additive manufacturing of the preproduct according to the 3D model of the preproduct using an additive manufacturing device and an additive manufacturing composition comprising:
   i) at least one silicone building block bearing a plurality of alkenyl groups (A);
   ii) at least one crosslinking agent bearing a plurality of thiol groups (B);
   iii) at least one free radical photoinitiator (D);
c) post-curing treatment that comprises at least one further curing step other than light-promoted curing, preferably either heat promoted radical curing or silanol condensation curing;

wherein the ratio of thiol groups to alkenyl groups in the additive manufacturing composition is in the range from 0.5:1 to 5:1.

In another aspect, the present invention is directed to an additive manufacturing composition comprising:

i) at least one silicone building block bearing a plurality of alkenyl groups (A);
ii) a crosslinking agent bearing a plurality of thiol groups (B);
iii) at least one free radical photoinitiator (D), preferably in an amount in the range from 0.01 to 3.0 parts per weight, more preferably in the range from 0.1 to 2.0 parts per weight, relative to the total weight of silicone building blocks bearing a plurality of alkenyl groups;
iv) a thermally activatable free radical initiator (E) in an amount in the range from 0.1 to 5.0 parts per weight, preferably 0.2 to 3.0 parts per weight, relative to the total weight of silicone building blocks bearing a plurality of alkenyl groups;

wherein the ratio of thiol groups to alkenyl groups in the composition is in the range from 0.5:1 to 5:1.

In a further aspect, the present invention is directed to an additive manufacturing composition comprising:

i) at least one silicone building block bearing a plurality of alkenyl groups (A);
ii) a crosslinking agent bearing a plurality of thiol groups (B);
iii) a condensation cure silicone blend (C1), preferably in an amount in the range from 1 to 90 parts per weight, relative to the total weight of silicone building blocks bearing a plurality of alkenyl groups;
iv) at least one free radical photoinitiator (D) preferably in an amount in the range from 0.01 to 3.0 parts per weight, more preferably in the range from 0.1 to 2.0 parts per weight, relative to the total weight of silicone building blocks bearing a plurality of alkenyl groups;

wherein the ratio of thiol groups to alkenyl groups in the composition is in the range from 0.5:1 to 5:1.

In yet another aspect, the present invention is directed to a 3D-printed silicone, obtainable by the method of the present invention, being at least 1×1×1 mm in size, preferably at least 3×3×3 mm, most preferably at least 5×5×5 mm, wherein the variation of the numerical value of Shore A hardness, measured according to ISO 7619-1, between samples taken from the surface of the cured composition and the centre of the cured composition differ by less than 10%, preferably by less than 5%, most preferably the numerical values are the same.

In yet a further aspect, the present invention is directed to the use of a thermally activatable free radical initiator (E) in a process comprising the steps of:

a) preparation of a 3D model of a preproduct;
b) additive manufacturing of the preproduct according to the 3D model of the preproduct using an additive manufacturing device and an additive manufacturing composition comprising
   i) at least one silicone building block bearing a plurality of alkenyl groups (A);
   ii) a crosslinking agent bearing a plurality of thiol groups (B);
   iii) at least one free radical photoinitiator (D), preferably in an amount in the range from 0.01 to 3.0 parts per weight, more preferably in the range from 0.1 to 2.0 parts per weight, relative to the total weight of silicone building blocks bearing a plurality of alkenyl groups;

wherein the ratio of thiol groups to alkenyl groups in the composition is in the range from 0.5:1 to 5:1;
c) post-curing treatment comprising a heat promoted radical curing step, wherein the preproduct is preferably heated at a constant temperature in the range from 30° C. to 200° C. for a time period in the range from 1 second to 24 h;

wherein the thermally activatable free radical initiator (E) is preferably present in the additive manufacturing composition of step b) in an amount in the range from 0.1 to 5.0 parts per weight, preferably 0.2 to 3.0 parts per weight, relative to the total weight of silicone building blocks bearing a plurality of alkenyl groups; for the production of 3D-printed silicone having one or more of the following properties:

a) a Young's modulus, measured according to ISO 37 on Type 4 tensile specimen, in the range from 110 to 10,000% of the Young's modulus of 3D-printed silicone produced from the same additive manufacturing composition in the absence of the free radical initiator (E) or heat promoted radical curing step,
b) an elongation at break, measured according to ISO 37 on Type 4 tensile specimen, in the range from 110 to 1,000% of the elongation at break of 3D-printed silicone produced from the same additive manufacturing composition in the absence of the free radical initiator (E) or heat promoted radical curing step,
c) a tensile strength, measured according to ISO 37 on Type 4 tensile specimen, in the range from 110 to 500% of the tensile strength of 3D-printed silicone produced from the same additive manufacturing composition in the absence of the free radical initiator (E) or heat promoted radical curing step,
d) a tear strength, measured according to ASTM D624 on samples of Specimen Type C, in the range from 110 to 400% of the tear strength of 3D-printed silicone produced from the same additive manufacturing composition in the absence of the free radical initiator (E) or heat promoted radical curing step,
e) a Shore A hardness, measured according to ISO 7619-1, wherein the numerical value is in the range from 110 to 2,500% of the numerical value of the Shore A hardness of 3D-printed silicone produced from the same additive manufacturing composition in the absence of the free radical initiator (E) or heat promoted radical curing step.

In a final aspect, the present invention is directed to the use of a condensation cure silicone blend (C1) in a process comprising the steps of:

a) preparation of a 3D model of a preproduct;
b) additive manufacturing of the preproduct according to the 3D model of the preproduct using an additive manufacturing device and an additive manufacturing composition comprising:
   i) at least one silicone building block bearing a plurality of alkenyl groups (A);
   ii) a crosslinking agent bearing a plurality of thiol groups (B);
   iii) at least one free radical photoinitiator (D), preferably in an amount in the range from 0.01 to 3.0 parts per weight, more preferably in the range from 0.1 to 2.0 parts per weight, relative to the total weight of silicone building blocks bearing a plurality of alkenyl groups;

wherein the ratio of thiol groups to alkenyl groups in the composition is in the range from 0.5:1 to 5:1;

c) post-curing treatment comprising a silanol condensation curing step, preferably consisting of exposing the preproduct to a relative humidity of greater than 20%, preferably of greater than 50%, for a time period in the range from 1 min to 72 h, preferably from 6 to 36 h;

wherein the condensation cure silicone blend (C1) is preferably present in the additive manufacturing composition of step b) in an amount in the range from 1 to 90 parts per weight, relative to the total weight of silicone building blocks bearing a plurality of alkenyl groups;

for the production of 3D-printed silicone having one of more of the following properties:

a) a Young's modulus, measured according to ISO 37 on Type 4 tensile specimen, in the range from 110 to 10,000% of the Young's modulus of 3D-printed silicone produced from the same additive manufacturing composition in the absence of the condensation cure silicone blend (C1) or silanol condensation curing step,
b) an elongation at break, measured according to ISO 37 on Type 4 tensile specimen, in the range from 110 to 1,000% of the elongation at break of 3D-printed silicone produced from the same additive manufacturing composition in the absence of the condensation cure silicone blend (C1) or silanol condensation curing step,
c) a tensile strength, measured according to ISO 37 on Type 4 tensile specimen, in the range from 110 to 500% of the tensile strength of 3D-printed silicone produced from the same additive manufacturing composition in the absence of the condensation cure silicone blend (C1) or silanol condensation curing step,
d) a tear strength, measured according to ASTM D624 on samples of Specimen Type C, in the range from 110 to 400% of the tear strength of 3D-printed silicone produced from the same additive manufacturing composition in the absence of the condensation cure silicone blend (C1) or silanol condensation curing step,
e) a Shore A hardness, measured according to ISO 7619-1, wherein the numerical value is in the range from 110 to 2,500% of the numerical value of the Shore A hardness of 3D-printed silicone produced from the same additive manufacturing composition in the absence of the condensation cure silicone blend (C1) or silanol condensation curing step.

BRIEF DESCRIPTION OF THE DRAWINGS

FIG. 1 illustrated a 3D printed sample according to an embodiment of the present disclosure prepared as described in the experimental section.

FIG. 2 illustrates a depth of cure of UV and Heat cured samples according to an embodiment of the present disclosure.

FIG. 3 illustrates a 3D printed ear-shaped prosthesis manufacturing composition 3 of the examples of the present disclosure.

Definitions

The term "additive manufacturing", as used herein, refers to methods such as stereolithography, e.g. laser based stereolithography (SLA) and digital light processing (DLP), material jetting, drop on demand, volumetric 3D printing, i.e. holographic laser 3D printing, material extrusion, e.g. robocasting.

In typical stereolithography methods, a build platform is positioned in a vat or tank containing an additive manufacturing composition of the invention, at a distance of the height of one layer from the surface of the liquid, and a light source selectively polymerises and solidifies the additive manufacturing composition to generate the next layer. SLA printers use a laser source that travels over the predetermined area of a layer of the part, while DLP printers use a digital light projector to flash a single image of each layer all at once, which can also raster over larger areas for build volumes larger than the projection. The process steps are repeated until the 3D object is completed. Further post-processing under UV/Vis light and or exposure to other sources of radiation ensures that the object is in a fully crosslinked state (necessary in particular if high mechanical and thermal properties are desirable).

A "top-down" orientation refers to a printer wherein the light source is placed above the tank and the build platform begins at the very top of the tank and moves downwards after every layer. Typically, the direction normal to the 3D printed layers of a 3D object is referred to as the z-direction (or axis) and the direction parallel to the 3D printed layers of a 3D object (and thus perpendicular to the z axis) is referred to as the xy plane. The object in a top-down printer is built facing up.

A "bottom-up" orientation refers to a printer wherein the light source is placed under the tank having a suitable transparent bottom to allow the light source to pass through. After every layer, the cured additive manufacturing composition is detached from the bottom of the tank, as the build platform moves upwards. The object in a bottom-up printer is built facing upside down.

In typical material jetting methods, a printhead deposits droplets of an additive manufacturing composition to the desired locations on a build platform. A radiation source attached to the printhead cures and solidifies the composition to generate the first layer and the build platform is moved downward to allow the process steps to be repeated until the 3D object is completed. The deposition of the droplets can be in a continuous fashion, wherein the droplets are generated by breaking up a continuous stream of droplets, or by drop on demand, wherein droplets are generated when required.

In typical volumetric (i.e. holographic) printing methods, the 3D object is generated simultaneously as one part, by projecting light source(s) in a hologram-like pattern into a transparent tank containing an additive manufacturing composition to allow the composition to cure as one part. After the object is completed, the excess composition can be drained off to reveal the completed object.

In typical material extrusion printing methods, an additive manufacturing composition is extruded through a nozzle and onto a build platform or substrate, whereby the nozzle is following a predetermined path to build the 3D object layer-by-layer.

The additive manufacturing composition can be used in any typical 3D printer. In one embodiment the composition can be used in SLA or DLP printers, preferably top-down SLA or DLP printers in which a build platform is positioned at the very top of a tank filled with liquid photopolymer resin and a light source placed above the tank selectively cures and solidifies layer by layer (by moving the platform downwards after each layer) to create the desired 3D product (face up). In another embodiment the additive manufacturing composition can be used in volumetric or holographic 3D printers, wherein laser-generated, hologram-like 3D images are flashed into an additive manufacturing composition contained in a tank to create the desired 3D product in one part.

The term "emulsion," as used in the context of the present invention, refers to a stable mixture of two or more immiscible (e.g. polysiloxane) components in which (at least) one component (the dispersed phase) is in form of microscopic droplets dispersed in the (at least one) other component (the continuous phase). It will be appreciated that the term "immiscible" also includes predominantly or substantially immiscible phases whereby the dispersed phase has a finite solubility in the continuous phase. The mixture may be stabilized further by the presence of additives, such as emulsifiers or surfactants.

The term "transparent" as used herein refers to the property of transmitting at least 70%, preferably at least 80%, more preferably at least 90% of the visible incident light (without diffusing it). The term "translucent" refers to the property of a reduced passage of light, such as transmitting less than 60%, more preferably less than 50%.

The term "silicone building blocks" as used herein refers to polymeric silicone building blocks, that are commonly used to synthesise more extended networks, as opposed to the individual monomers within these polymeric building blocks. The silicone building blocks are typically in liquid to viscous form as opposed to the solid silicone networks that result from polymerisation/curing. Silicone building blocks are typically polysiloxanes, however may also be silsesquioxanes, or blends incorporating both polysiloxanes and silsesquioxanes.

The term "polysiloxane" refers to linear, branched and cyclic polyorganosiloxanes, which are characterized by the general formula $(R)_3Si—(O—Si(R)_2)$ n-O—$Si(R)_3$, with R being H or an organic group and n is an integer, typically between 1 and $10^9$. In the polyorganosiloxanes, the organo moiety may be the same (such as a methyl group in polydimethylsiloxane or PDMS) or may vary within a single molecule (as for example in polydimethyldiphenyl siloxane or diphenyl dimethicone).

The term "silsesquioxane" refers to organo silicone compounds with the chemical formulas $[RSiO_{1.5}]_n$, wherein R═H, alkyl, aryl or alkoxyl. In these compounds the silicon is typically bonded to 3 oxygen atoms (or 4 if R=alkoxyl) in contrast to the 2 oxygen atoms in polysiloxanes. Silsesquioxanes may exhibit cage-like structure or polymeric structure. Whilst the cage-structures are more ubiquitous, these can undergo rearrangement reactions to form ladder-like polymeric structures with high degrees of crosslinking, as is the case for poly(phenylsilsesquioxane).

In the following description, many amounts are given as "parts per weight, relative to the total weight of a different component (or combination of components)". In each case, this means that the total weight of the reference component (or combination of components) is taken to be 100 parts per weight, whilst the component in question has a relative weight in the given range.

DETAILED DESCRIPTION OF THE INVENTION

Method for Preparing a 3D-Printed Silicone

The method of the present invention comprises:

a) preparation of a 3D model of a preproduct;

b) additive manufacturing of the preproduct according to the 3D model of the preproduct using an additive manufacturing device and an additive manufacturing composition comprising:

- i) at least one silicone building block bearing a plurality of alkenyl groups (A);
- ii) at least one crosslinking agent bearing a plurality of thiol groups (B);
- iii) at least one free radical photoinitiator (D);

c) post-curing treatment that comprises at least one further curing step other than light-promoted curing, preferably either heat promoted radical curing or silanol condensation curing;

wherein the ratio of thiol groups to alkenyl groups in the additive manufacturing composition is in the range from 0.5:1 to 5:1.

It is understood that the preproduct is the product directly obtained by step b), before the post-curing treatment c). Typically, the 3D model of the preproduct is prepared as a CAD (computer aided design) file or 3D scan. The resulting CAD data can then be converted into a format which is suitable for or readable by the additive manufacturing device. The 3D model of the preproduct usually contains all relevant information necessary for the additive manufacturing of the actual preproduct in step b). For example, the 3D model may contain information regarding dimension, structure, size, colour, etc. of the preproduct. Furthermore, the 3D model may contain information regarding the orientation of the preproduct. In particular, the 3D model of the preproduct may contain information regarding the orientation of the actual preproduct with respect to the additive manufacturing device or with respect to certain components of the additive manufacturing device.

It is preferred that the additive manufacturing device comprises a radiation source for irradiating at least a portion of the additive manufacturing composition.

More preferably, the radiation source may be a LED lamp. In particular, the intensity of the LED lamp is between 1 and 1 000 mW/cm$^2$, preferably between 5 and 50 mW/cm$^2$.

It is also preferred that the additive manufacturing in step b) is performed by light polymerization, wherein additive manufacturing is performed by VAT photopolymerization, volumetric 3D printing or holographic laser 3D printing or any other suitable method. More preferably, the additive manufacturing is performed by DLP or SLA VAT photopolymerization. In a particularly preferred embodiment, photopolymerization is performed in a top-down orientation.

It is preferred that the additive manufacturing device comprises a chamber containing the additive manufacturing composition and a platform within the chamber, which is moved in the z-direction during step b). Such an additive manufacturing device is either suitable for use in a top-down or in a bottom-up orientation.

Furthermore, it is preferred that the 3D model in step a) is prepared such that the stability of the preproduct is maximized. Such stabilization, such as mechanical stabilization or positional stabilization, in particular lateral stabilization is important for 3D printed silicones, as in contrast to commonly 3D printed rigid materials, the elastic and soft characteristics of silicones leads to greater instability of the emerging preproduct during the additive manufacturing.

For example, in some embodiments, the center of mass of the actual preproduct is determined in step a). The 3D model of the preproduct is prepared such that a distance between the determined center of mass of the preproduct and the platform is minimized. Thus, in these embodiments, the 3D model of the preproduct contains data regarding the orientation of the preproduct with respect to the platform. Minimizing this distance provides for a significant increase in stability of the preproduct. In particular, the lateral stability is increased, which is typically critically affected by the use of a recoater. Consequently, the necessity of printing large support structures is decreased.

It is further preferred that the 3D model of the preproduct in step a) is prepared such that the surface area of the actual preproduct being in contact with the platform and/or the projected surface area from the preproduct to the build platform is maximized, thereby increasing the stability of the preproduct.

Alternatively, or additionally, the stability of the preproduct may be increased by providing support structures, which may be more massive than the ones commonly used for rigid 3D printed polymers. Typically, these support structures may already be contained in the 3D model of the preproduct. Such support structures are commonly removed from the preproduct after the additive manufacturing is complete. Thus, embodiments with support structures may comprise the removal of the support structure, either before or after step c). Removal may be achieved by any suitable method, such as cutting, slicing, ripping etc.

It is preferred that the additive manufacturing device comprises a recoater or wiper, for example a blade.

The use of a recoater is particularly beneficial for additive manufacturing compositions having high viscosity, since the recoater promotes shear thinning of the additive manufacturing composition, enabling the use of compositions that have too high a viscosity to be employed in standard additive manufacturing processes.

Furthermore, step b) of the method according to the invention preferably comprises the steps:

i) Dipping the platform into the additive manufacturing composition at a predefined height to apply a layer of the additive manufacturing composition to the platform or to the surface of the emerging preproduct;
ii) Moving the platform such that at least the applied layer of additive manufacturing composition is above the additive manufacturing composition;
iii) Providing a film of the additive manufacturing composition with a predefined thickness by wiping the applied layer of the additive manufacturing composition with the recoater;
iv) Irradiating the applied film of the additive manufacturing composition with the radiation source;
v) Optionally moving the platform in the z-direction.
vi) Optionally repeating steps ii), iii) iv) and/or v).

In some embodiments, the method consists of steps i) to vi).

In step i), the predefined height is typically chosen such that the platform dips more than an additive manufacturing layer height into the additive manufacturing composition. An additive manufacturing layer height is the height of a layer which is formed during step iv) and may preferably be in the range of 5 to 1'000 μm. Preferably, the predetermined height is chosen such that the additive manufacturing composition covers the entire surface of the platform or the entire surface of the emerging preproduct. The predetermined height is thereby influenced by the dipping speed of the platform, material flow behaviour and surface tension. Alternatively, or additionally, the predefined height may be chosen such that the distance between the platform and the surface of the additive manufacturing composition within the chamber is at least between 1'000 and 50'000 μm.

In some embodiments a self-levelling of the applied film is performed after step ii) and before step iii), by providing a self-levelling time of preferably 100 to 10'000 ms, which is sufficient for efficient self-levelling of the additive manufacturing composition.

It is preferred that wiping is performed by mechanical wiping in circular trajectory or in a linear motion. In general, wiping removes the excess material and only leaves an additive manufacturing layer thickness of raw material on top of the emerging object.

It is readily understood by the person skilled in the art that a surface of the emerging product refers to the most recently manufactured layer, which will be covered by an additional layer upon repeating steps ii) to iv).

In step iv), the z-direction refers to the printing direction. Thus, the z-direction is transverse to the manufactured layers of the preproduct. For example, if additive manufacturing is performed with a top-down orientation, the platform is moved downwards, i.e. in the direction of the bottom of the chamber.

Movement in the z-direction is performed by at least the thickness of a single layer preferably 5 to 1'000 μm.

It is preferred that the distance of the platform to the radiation source is adjusted after step ii) and before irradiating the applied film.

It is also preferred that the radiation source is moved into a predefined focal distance before step iv). For example, the predefined focal distance may be 10 to 100 cm, preferably 15 to 30 cm.

Furthermore, it is preferred that the illumination of the applied film in step iv) is performed for more than 50 ms, in particular more than 150 ms. Preferably, the applied film is illuminated for 100 to 5 000 ms, more preferably for 150 to 4 000 ms.

Preferably, the recoater is operated at a speed of 0.1 to 100 mm/s. This value has been found to enable a fast printing speed, but also not critically influence the lateral stability of the emerging preproduct.

It is also preferred that the additive manufacturing device comprises a sealable housing. Preferably, the housing is hermitically sealable. Typically, the housing is free of oxygen. Preferably the sealed housing is filled or pressurized essentially only with an inert gas, such as nitrogen or argon. Employing an inert atmosphere or vacuum increases the yield of the polymerization reaction, as the presence of oxygen may react and/or quench with any of the radical species formed during the thiol-ene reaction.

Additionally, it may be preferred that the additive manufacturing composition is maintained at a predefined temperature during step b) of the method according to the invention, thereby adjusting the viscosity of the additive manufacturing composition. It has been observed, that the viscosity should typically not exceed 500 Pa*s. The higher the viscosity, the slower is the self-levelling to provide a smooth surface before irradiation can take place. Thus, if the viscosity of the additive manufacturing composition is too high, its temperature may be increased. The predefined temperature may in some embodiments be in the range of 0 to 250° C.

The viscosity of the additive manufacturing composition may also be controlled appropriately by tailoring of the shear thinning characteristics.

It is preferred that the intensity of irradiation, which is typically measured at the surface of the additive manufacturing composition and/or the applied film to be illuminated by the radiation source, is reduced by 0 to 99%, preferably 50 to 90% of its original value. The use of the additive manufacturing composition as described herein has the advantage that its reactivity in the polymerization reaction is high. Therefore, the intensity of the radiation source can be reduced, which significantly reduces over exposure due to light scattering and thus increases the printing resolution.

For example, it is preferred that the intensity of irradiation is reduced by digitally changing the grey scale of the projector and/or by providing a physical light filter between the radiation source and additive manufacturing composition.

Furthermore, it is preferred that in step c) post-curing treatment further comprises prewashing the preproduct. Prewashing may typically be performed by prewashing the preproduct with a solvent, for example an alkane, such as cyclohexane, n-hexane, pentane and the like for removing any residues of the additive manufacturing composition. Additionally or alternatively, the preproduct is then swelled in preferably the same or alternatively in another solvent, either by rinsing the preproduct or by immersing the preproduct in this other solvent. As an alternative to the preferred alkane solvents, alcohols, such as i-propanol, n-propanol or ethanol may be used for swelling the preproduct. In preferred embodiments, agitation, stirring, vibration, sonification and/or heating can be used for improving the swelling of the product. Additionally, or alternatively, the preproduct is post-cured under light irradiation, preferably for 10 s to 30 min. The post-curing ensures complete polymerization of the components of the additive manufacturing composition.

The person skilled in the art would be aware that post-curing under light irradiation, as described above, results in the curing of unreacted monomers that are close to the surface of the preproduct, whereas the heat-promoted radical curing step and/or silanol condensation curing step result in much deeper curing of unreacted monomers. The optional post-curing under light irradiation is or is not separate to the heated promoted radical curing step and/or silanol condensation curing step required in the process of the present invention.

If step c) comprises both post-curing with light irradiation and a heat promoted radical curing step, then the post-curing with light preferably occurs before the heat promoted radical curing step to give the preproduct form stability.

If step c) comprises both post-curing with light irradiation and a silanol condensation curing step, then the post-curing with light can occur before the silanol condensation step, or alternatively the two steps can be carried out simultaneously, preferably the steps are carried out simultaneously, although the silanol condensation curing step can continue after the post-curing with light is complete.

The Additive Manufacturing Composition of the Method for Preparing a 3D-Printed Silicone The additive manufacturing composition of the method of the present invention comprises:

i) at least one silicone building block bearing a plurality of alkenyl groups (A);

ii) at least one crosslinking agent bearing a plurality of thiol groups (B);

iii) at least one free radical photoinitiator (D);

wherein the ratio of thiol groups to alkenyl groups in the additive manufacturing composition is in the range from 0.5:1 to 5:1.

In addition to the at least one silicone building block bearing a plurality of alkenyl groups (A), it can in certain situations be beneficial for the additive manufacturing composition of the present invention to comprise one or more further silicone building block(s) bearing alkenyl groups.

The one or more further silicone building blocks bearing alkenyl groups are different to the first silicone building block bearing a plurality of alkenyl groups (A).

Further silicone building blocks bearing a single alkenyl group may be used as plasticizers, whereas further silicone building blocks bearing a plurality of alkenyl groups may be used in order to tailor the final properties of the 3D-printed silicone product.

If the one or more further silicone building blocks bears a plurality of alkenyl groups, then it typically has a lower alkenyl group density and/or longer chain length than the first silicone building block bearing a plurality of alkenyl groups (A).

The further silicone building blocks can furthermore differ from the first silicone building block bearing a plurality of alkenyl groups (A) in one or more of the following properties: viscosity, valency of functional groups, molecular mass, molecular weight, silsesquioxane resin concentration and/or the nature of the alkenyl derivatization (i.e. whether the alkenyl groups are at the terminus of the polysiloxane/silsesquioxane chain or present in comonomer units within the polysiloxane/silsesquioxane chain).

If the further silicone building blocks bearing alkenyl groups are present in the additive manufacturing composition of the present invention, it is preferred that the weight ratio of the first silicone bearing a plurality of alkenyl groups (A) to further silicone building blocks bearing alkenyl groups is in the range from 99:1 to 10:90.

It is preferred that the alkenyl groups in the at least one silicone building block bearing a plurality of alkenyl groups (A) are selected from vinyl, allyl, butenyl or pentenyl, most preferably vinyl.

It is also preferred that the alkenyl groups in any further silicone building blocks bearing alkenyl groups are selected from vinyl, allyl, butenyl or pentenyl, most preferably vinyl.

It is further preferred that the alkenyl groups in both the at least one silicone building block bearing a plurality of alkenyl groups (A) and any further silicone building blocks bearing alkenyl groups are selected from vinyl, allyl, butenyl or pentenyl, most preferably vinyl.

It is additionally preferred that the at least one silicone building block bearing a plurality of alkenyl groups (A) is selected from alkenyl-derivatized poly(alkylsiloxane), alkenyl-derivatized poly(arylsiloxane), alkenyl-derivatized poly(alkylarylsiloxane), and alkenyl-derivatized poly(alkyl (aryl) siloxane), wherein the alkyl groups are preferably selected from C (1-6)alkyl, more preferably methyl, ethyl, propyl or butyl, and each option in the list may be present either in polysiloxane form, or blended with silsesquioxanes. More preferably the at least one silicone building block bearing a plurality of alkenyl groups (A) is selected from alkenyl-derivatized poly(dimethylsiloxane), alkenyl-derivatized poly(diphenysiloxane), alkenyl-derivatized poly(methylphenylsiloxane), alkenyl-derivatized poly(dimethyldiphenylsiloxane), wherein each option in the list may be present either in polysiloxane form, or blended with silsesquioxanes.

It is also preferred that any further silicone building blocks bearing a plurality of alkenyl groups are selected from alkenyl-derivatized poly(alkylsiloxane), alkenyl-derivatized poly(arylsiloxane), alkenyl-derivatized poly(alkylarylsiloxane), and alkenyl-derivatized poly(alkyl (aryl) siloxane), wherein the alkyl groups are preferably selected from C (1-6)alkyl, more preferably methyl, ethyl, propyl or butyl. More preferably any further silicone building blocks bearing a plurality of alkenyl groups are selected from alkenyl-derivatized poly(dimethylsiloxane), alkenyl-derivatized poly(diphenysiloxane), alkenyl-derivatized poly(methylphenylsiloxane), alkenyl-derivatized poly(dimethyldiphenylsiloxane).

It is further preferred that both the at least one silicone building block bearing a plurality of alkenyl groups (A) and any further silicone building blocks bearing a plurality of alkenyl groups are selected from alkenyl-derivatized poly (alkylsiloxane), alkenyl-derivatized poly(arylsiloxane), alkenyl-derivatized poly(alkylarylsiloxane), and alkenyl-derivatized poly(alkyl (aryl) siloxane), wherein the alkyl groups are preferably selected from C (1-6)alkyl, more preferably methyl, ethyl, propyl or butyl. More preferably both the at least one silicone building block bearing a plurality of alkenyl groups (A) and any further silicone building blocks bearing a plurality of alkenyl groups are selected from alkenyl-derivatized poly(dimethylsiloxane), alkenyl-derivatized poly(diphenysiloxane), alkenyl-derivatized poly(methylphenylsiloxane), alkenyl-derivatized poly (dimethyldiphenylsiloxane).

Such polymers can be prepared as described in numerous patents and publications or are commercially available as Liquid Silicone Rubbers (LSR), High Temperature Vulcanized (HTV) Silicones or Room-Temperature Vulcanization (RTV) Silicones.

Exemplary silicone resins that either comprise or consist of silicone building blocks suitable for use as the at least one silicone building block bearing a plurality of alkenyl groups (A) include Ecoflex® 00-15 (Smooth On, USA), Ecoflex® 00-20 (Smooth On, USA), Dragon Skin™ 30 (Smooth On, USA), Sorta-Clear® 40 (KauPo, DE), PlatSil® 73-15 (Mouldlife, GB), Sylgard® 184 (Sigma-Aldrich, CH), Zhermack 00 Zhermack 08, Zhermack 13 (Zhermack, DE), LS-8941 (NuSil, USA), KE-2061 (Shin-Etsu Chemical, JP), VQM-146 (Gelest Inc., DE), VQM973 (Evonik, DE), Ecoflex® 00-50 Part A (Smooth On, USA), Silopren™ U Base Compound P 1300 (Momentive, US), Silopren™ U Base Compound P 300 (Momentive, US), and HANSA MBA™ 37130 (CHT, DE).

Suitable silicone resins that may be used as silicone building blocks bearing a single alkenyl group, for application as plasticisers, include Polymer VS 10000 (Evonik, DE), Polymer MV 2000 (Evonik, DE), and Silopren™ U 10 Base Polymer (Momentive, US).

In both the at least one silicone building block bearing a plurality of alkenyl groups (A) and any further silicone building blocks bearing alkenyl groups, the alkenyl group may be present either as a terminal group and/or in a side chain.

The at least one silicone building block bearing a plurality of alkenyl groups (A) and any further silicone building blocks bearing alkenyl groups may be polysiloxanes, silsesquioxanes, or a mixture thereof.

Polysiloxanes bearing a plurality of alkenyl groups useful in the present invention include polymers, prepolymers, oligomers or macromonomers having at least 1, typically between 1 and $10^9$, preferably 100 to 10'000'000 siloxane repeat units, in form of homopolymers or random- or block-copolymers, preferably homopolymers. Optionally, the polysiloxanes bearing a plurality of alkenyl groups may carry additional functional groups, e.g. as terminal groups or located on side chain(s) of the siloxane backbone.

The weight average molecular weight range of polysiloxanes bearing a plurality of alkenyl groups that may be used in the present invention, is preferably 100 to $10^9$ g/mol, more preferably 1'000 to 10'000'000. Said polysiloxanes bearing a plurality of alkenyl groups may have a viscosity between 0.01 and 105 Pa*s, preferably between 1 and 500 Pa*s when measured at a shear rate of 1/s according to standard steady-state rheological measurements.

The at least one crosslinking agent bearing a plurality of thiol groups (B) according to the present invention is preferably described by formula (I):

$$R^1(R)_2SiO((R^3R)SiO)_xSi(R)_2R^2 \quad (I)$$

wherein R is independently C (1-12)alkyl, preferably methyl;

$R^1$, $R^2$, $R^3$ are independently C (1-12)alkyl, preferably methyl, or mecapto-C(1-12)alkyl, wherein each instance of $R^3$ may be the same (i.e. homopolymer) or different (i.e. copolymer); and x is 1 or more, preferably 1 to 100, with the proviso that at least one, preferably 10 to 100'000, of $R^1$, $R^2$, $R^3$ is mercapto-C(1-12)alkyl.

C(1-12)alkyl is preferably C (1-8)alkyl, more preferably C (1-6)alkyl, more preferably methyl, ethyl, butyl, propyl. Thus, the mercaptoalkyl group preferably has 1 to 8 C-atoms, preferably 1 to 6 C-atoms, and is more preferably mercapto-methyl, mercapto-ethyl, mercapto-butyl, mercapto-propyl, most preferably mercapto-propyl.

In some embodiments, x is in the range from 40 to 60.

It is preferred that the at least one crosslinking agent bearing a plurality of thiol groups (B) of the present invention has the formula (I), wherein R, $R^1$, $R^2$ are independently C (1-12)alkyl, preferably methyl; $R^3$ is independently mercapto-C(1-12)alkyl, more preferably mercapto-C(1-6)alkyl, or C (1-12)alkyl, most preferably methyl; and x is 1 or more, more preferably 2 to 100'000, most preferably 5 to 1'000.

For x>1, each instance of $R^3$ can be the same (e.g. a homopolymer), preferably $R^3$ is mercapto-C(1-12)alkyl, more preferably mercapto-C(1-6)alkyl as defined above. Alternatively, different instances of $R^3$ can be different (e.g. an alternating or block copolymer), preferably $R^3$ is -(mercapto-C(1-6)alkyl)$_n$-(C (1-12)alkyl)$_m$ or —(C(1-12)alkyl)$_m$-(mercapto-C(1-6)alkyl)$_n$-, wherein-(mercapto-C(1-6)alkyl)$_n$-(C (1-12)alkyl)$_m$- are as defined above and n and m are independently 1 to 100'000, preferably n is 1 to 10'000 and m is 1 to 10'000.

It is further preferred that the at least one crosslinking agent bearing a plurality of thiol groups (B) of the present invention has the formula (I), wherein R, $R^1$, $R^2$ are independently C (1-12)alkyl, more preferably methyl; $R^3$ is independently mercapto-methyl, mercapto-butyl mercapto-ethyl or mercapto-propyl; and x is 1 or more, more preferably 2 to 100'000, most preferably 2 to 10'000.

Exemplary crosslinking agents bearing a plurality of thiol groups (B) according to formula (I) that may suitable for use in the present invention include SMS-022, SMS-042, SMS-992 (Gelest Inc., DE), KF-2001, KF-2004 (Shin-Etsu Chemical, JP), SIPELL® RE 61 F (Wacker Chemie AG, DE).

The additive manufacturing composition may comprise crosslinking agent bearing a plurality of thiol groups (B) or a blend of two or more crosslinking agents bearing a plurality of thiol groups (B), preferably one crosslinking agent bearing a plurality of thiol groups (B).

In a further embodiment of the additive manufacturing composition according to the present invention, the crosslinking agent bearing a plurality of thiol groups (B) has a molecular weight below 100,000 g/mol, preferably below 90,000 g/mol and more preferably below 80,000 g/mol.

In the additive manufacturing composition of the present invention, the ratio of thiol groups to alkenyl groups is in the range from 0.5:1 to 5:1. The alkenyl groups present may be present in the at least one silicone building block bearing a plurality of alkenyl groups (A) or any further silicone building blocks bearing alkenyl groups, if present. The thiol groups present may be present in the at least one crosslinking agent bearing a plurality of thiol groups (B).

Preferably the at least one silicone building block bearing a plurality of alkenyl groups (A) and the crosslinking agent bearing a plurality of thiol groups (B) form a stable emulsion.

In the context of the present invention, a stable emulsion is defined as being an emulsion that does not separate (phase separation, flocculation, creaming or sedimentation) after changes in ambient conditions, such as temperature, for at least 24 hours.

Furthermore, it is preferred that the stable emulsion does not exhibit any Ostwald ripening (i.e. the aggregation of small droplets into large droplets) within 6 hours, more preferably within 12 hours. The presence or absence of Ostwald ripening may be determined by means well known to the person skilled in the art, such as microscopy or dynamic light scattering (DLS).

The stable emulsion also has a minimum shelf life of 1 month, meaning that the reactivity will not have decreased by more than 10% during this timespan. In the context of the present invention, reactivity is defined as the minimal critical dose of energy (Ec) required to form a solid layer, as described in Equation 1:

$$Cd=Dp\times\ln(t\times Irr)+Ec \quad (1)$$

wherein Cd is the cure depth, given in [mm],

Dp is the depth of penetration, given in [mm], t=time (i.e. illumination time), given in [s], Irr=irradiance (i.e. the power of the light source), given in [$W/mm^2$], and Ec is the minimum dose of energy required to form a solid layer, given in [$J/mm^2$].

Said stable emulsion is formed as a result of the immiscibility of the at least one silicone building block bearing alkenyl groups (A) with the crosslinking agent bearing a plurality of thiol groups.

In embodiments wherein no further silicone building blocks bearing alkenyl groups are present, then an emulsion is formed between the at least first silicone building block bearing a plurality of alkenyl groups (A) and the crosslinking agent bearing a plurality of thiol groups (B). In said emulsion, the first silicone building block bearing alkenyl groups (A) typically forms the continuous phase, whilst the crosslinking agent bearing a plurality of thiol groups (B) forms the dispersed (discontinuous) phase.

In embodiments wherein further silicone building blocks bearing alkenyl groups are present, then an emulsion is formed between the silicone building blocks bearing a plurality of alkenyl groups (A) and the further silicone building blocks bearing alkenyl groups with the crosslinking agent bearing a plurality of thiol groups (B). In said emulsion, the mixture of silicone building blocks bearing a plurality of alkenyl groups (A) and further silicone building blocks bearing alkenyl groups typically forms the continuous phase, whilst the crosslinking agent bearing a plurality of thiol groups (B) forms the dispersed (discontinuous) phase.

Preferably, the emulsion is obtained by means of mixing or shearing (e.g. effective mixing in a suitable high shear mixer) at more than 100 rpm, more preferably 500 to 5,000 rpm, for several minutes, e.g. at 2000 rpm for at least 2 minutes, more preferably 5 to 15 minutes.

Alternatively, the mixing is described by the tip speed of the mixer. Thus, the emulsion is preferably obtained by means of mixing or shearing (e.g. effective mixing in a suitable high shear mixer) at a tip speed of more than 1 m/s, more preferably 2 to 10 m/s, for several minutes, e.g. at 5 m/s for at least 2 minutes, more preferably 5 to 15 minutes.

The emulsion may be stabilized with emulsion stabilizers such as surfactants and dispersants or may be stabilized with rheological modifiers such as fumed silica or nanoclays.

Within said emulsion, the discontinuous phase is mainly present as droplets having a diameter of no more than 100 μm, preferably of less than 10 μm, preferably 0.1 to 10 μm, which allows the emulsion to be sufficiently stable to prevent droplet coalescence and coarsening and to thus exhibit a good shelf life. The step-growth polymerization is expected to selectively occur close to or at the emulsion interface until the crosslinking agent is completely used up. The consumption of the dispersed phase (droplets) in the polymerisation process reduces the droplet size and the scattering of visible light, allowing for the preparation of transparent 3D objects. Thus, in specific embodiments the 3D silicone objects obtained according to the invention are translucent or transparent.

Moreover, the emulsions of the invention lead to polymerized 3D objects that distinguish themselves by exhibiting unidirectional properties (also with respect to the z-direction) and therefore a specific light penetration depth by light scattering (in the xy plane and the z direction) is achieved, which enables printing in high resolution (e.g. 30 μm) due to the limited penetration depth. Thus, in specific embodiments the 3D silicone objects obtained according to the invention are of high resolution.

In an alternative embodiment, the at least one silicone building block bearing a plurality of alkenyl groups (A) and the crosslinking agent bearing a plurality of thiol groups (B) form a continuous phase, i.e. there is no phase separation.

In such embodiments, the question of stability does not arise, since phase separation is not observed. The key feature to be avoided, either in the case of emulsions or homogenous mixtures, is the formation of a multiphasic system with more than one continuous phase.

The additive manufacturing composition according to the present invention preferably has a viscosity in the range from more than 1 to 2'000 Pa*s, more preferably in the range from 30 to 700 Pa*s, most preferably in the range from 50 to 300 Pa*s.

The additive manufacturing composition further comprises at least one free radical photoinitiator, which is capable of being activated upon exposure to radiation, i.e. upon exposure to UVA, UVB, UV C and the entire visible range, preferably UVA and the visible range, more preferably 355-420 nm.

Exemplary free radical photoinitiators suitable for the additive manufacturing composition according to the present invention include:

(i) acyl- and bisacylphosphine oxides such as 2,4,6-trimethylbenzoyl di-phenylphosphine oxide, bis-(2,4,6-trimethylbenzoyl)phenylphosphine oxide;

(ii) anisoin;

(iii) benzoin and benzoin alkyl ether, such as benzoin ethyl ether, benzoin isobutyl ether, benzoin methyl ether;

(iv) benzil and benzil dialkyl ketals such as benzil dimethyl ketal;

(v) acetophenone; hydroxyacetophenones such as 1-hydroxycyclohexyl phenyl ketone, 2-hydroxy-2-methyl-1-phenyl-1-propanone, 2-hydroxy-1-[4-(2-hydroxyethoxy)-phenyl]-2-methyl-1-propanone, 3'-hydroxyacetophenone, 4'-hydroxyacetophenone, 2-hydroxy-2-methylpropiophenone; (di)alkoxyacetophenones such as 2,2-diethoxyacetophenone, 2,2-dimethoxy-2-phenylacetophenone, 4'-ethoxyacetophenone; aminoacetophenones such as 2-benzyl-2-(dimethylamino)-1-[4-(4-morpholinyl)-phenyl]-1-butanone, 2-methyl-1-[4-(methylthio)-phenyl]-2-(4-morpholinyl)-1-propanone; aryloxyacetophenones such as 4'-phenoxyacetophenone;

(vi) benzophenone, 3,3',4,4'-benzophenonetetracarboxylic dianhydride, benzoylbiphenyl, (di) hydroxybenzophenones, such as 4'-dihydroxybenzophenone, 3-hydroxybenzophenone, 4-hydroxybenzophenone; and (di)alkylbenzophenones, such as 4-(dimethylamino) benzophenone, 2-methylbenzophenone, 3-methylbenzophenone, 2,5-dimethylbenzophenone, 3,4-dimethylbenzophenone, (di)aminobenzophenones, such as 4,4'-bis(dimethylamino)benzophenone, and 2-benzyl-2-(dimethylamino)-4'-morpholinobutyrophenone, 2-methyl-4'-(methylthio)-2-morpholinopropiophenone;

(vii) anthraquinone and alkyl anthraquinones, such as 2-ethylanthraquinone;

(viii) thioxanthones; alkylthioxanthones such as i-propylthioxanthone; and thioxanthen-9-ones such as 2-chlorothioxanthen-9-one;

(ix) dibenzosuberenone;

(x) a-Diketones such as camphorquinone, 9,10-phenanthrenequinone, 1-phenyl-propane-1,2-dione, 4,4'-dichlorobenzil, methybenzoylformate or their derivatives;

(xi) monoacyl- and diacylgermanium compounds such as benzoyltrimethylgermanium, dibenzoyldiethylgermanium, bis-(4-methoxybenzoyl)-diethylgermanium;

(xii) titanocenes such as bis-(eta$^5$-2,4-cyclopentadien-1-yl)-bis-[2,6-difluoro-3-(1H-pyrrol-1-yl)phenyl]-titanium.

Particular examples are acetophenone, anisoin, anthraquinone, benzil, benzoin, benzoin ethyl ether, benzoin isobutyl ether, benzoin methyl ether, benzophenone, 1-hydroxycyclohexyl phenyl ketone, 3,3',4,4'-benzophenonetetracarboxylic dianhydride, benzoylbiphenyl, 2-benzyl-2-(dimethylamino)-4'-morpholinobutyrophenone, 4,4'-bis (diethylamino)benzophenone, 4,4'-bis(dimethylamino) benzophenone, camphorquinone, 2-chlorothioxanthen-9-one, dibenzosuberenone, 2,2-diethoxyacetophenone, 4,4'-dihydroxybenzophenone, 2,2-dimethoxy-2-phenylacetophenone, 4-(dimethylamino)benzophenone, 4,4'-dimethylbenzil, 2,5-dimethylbenzophenone, 3,4-dimethylbenzophenone, diphenyl(2,4,6-trimethylbenzoyl) phosphine oxide/2-hydroxy-2-methylpropiophenone, 4'-ethoxyacetophenone, 2-ethylanthraquinone, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methybenzoylformate, 2-methyl-4'-(methylthio)-2-morpholinopropiophenone, phenanthrenequinone, 4'-phenoxyacetophenone, and thioxanthen-9-one.

In a specific embodiment, the additive manufacturing composition comprises as a free radical photoinitiator 1-hydroxycyclohexyl phenyl ketone (98%, Alfa Aesar, USA) and/or 2,2-dimethoxy-2-phenylacetophenone.

Typically, the at least one photoinitiator (D) is present in the amount of from 0.01 to 3.0 parts per weight, preferably in the range from 0.1 to 2.0 parts per weight, relative to the total weight of silicone building blocks bearing a plurality of alkenyl groups.

In one embodiment, the additive manufacturing composition comprises a single free radical photoinitiator.

In an alternative embodiment the additive manufacturing composition comprises a first free radical photoinitiator and a second free radical photoinitiator, e.g. a first free and a second free radical photoinitiator having the same, overlapping or different absorption behaviour. In one embodiment the additive manufacturing composition comprises a first and a second free radical photoinitiator having overlapping absorption behaviour. In another embodiment, the additive manufacturing composition comprises a first and a second free radical photoinitiator having different absorption behaviour.

It is understood that the absorption spectra of the first and second photopolymerization initiators can have some overlap. For example, the difference between the longest-wavelength absorption maxima of the first and second photopolymerization initiator may be at least 5 nm, preferably at least 10 nm, more preferably at least 15 nm.

In specific embodiments, the longest-wavelength absorption maximum of the first photopolymerization initiator is at a wavelength of less than 400 nm, e.g. of from 300 to less than 400 nm, preferably of from 330 to less than 400 nm, more preferably of from 340 to 380. The longest-wavelength absorption maximum of the second photopolymerization initiator is at a wavelength of at least 380 nm, e.g. of from 380 to 600 nm, preferably of from 400 to 500 nm, more preferably of from 400 to 480 nm.

Preferred embodiments include a combination of a germanium compound with a hydroxyacetophenone, preferably a combination of bis(4-methoxybenzoyl) diethylgermanium with 1-hydroxycyclohexyl phenyl ketone. The germanium compound, preferably bis(4-methoxybenzoyl) diethylgermanium, and the hydroxyacetophenone are preferably present in a ratio in the range from 1:1 to 3:1, more preferably in the range from 1.5:1 to 2.5:1, most preferably in a ratio of 2:1.

It is also preferred that the additive manufacturing composition comprises at least one light blocker such that the photocatalytic reaction is confined to regions of direct exposure, is not initiated prematurely and allows to assure adequate shelf life. Suitable light blockers include e.g. light blockers with an absorption maximum in the range of the beam wavelength of the light source used for photopolymerization or colourants such as (an inorganic or organic) colour pigments (e.g. carbon black, blue, red), an organic dye, or the like, that absorb the light and do not retransmit. Other suitable blockers (in particular for transparent compositions include fluorescent agents/optical brighteners, photochromic and thermochromic dyes, leuco dyes or absorbers that absorb light and emit light at a different frequency.

Commercially available light blockers suitable for use in the additive manufacturing composition include avobenzone, coumarin, 1-(4-tert-butylphenyl)-3-(4methoxyphenyl)-1,3-propanedione (TCI, DE), 5-tert-butyl-2-hydroxybenzaldehyde (Sigma-Aldrich, CH), 2,2'-(2,5-thiophenediyl)bis(5-tert-butylbenzoxazole (Sigma-Aldrich, CH), 2-hydroxy-4-methoxybenzophenone-5-sulfonic acid (Alfa Aesar, USA), 2-(2'-Hydroxy-3', 5'-di-tert-amylphenyl) benzotriazole (Mayzo, USA) or 2-hydroxy-4-methoxybenzophenon (Alfa Aesar, USA).

It is preferred that the light blocker is present in an amount of from 0.01 to 0.50 parts per weight, preferably from 0.10 to 0.30 parts per weight, relative to the total weight of silicone building blocks bearing a plurality of alkenyl groups.

The determination of the wavelength of the absorption maximum and of the molar absorption coefficient of the photoinitiators and light blockers is usually carried out by means of UV-VIS spectroscopy, such as a customary double-beam UV-VIS spectrometer, at room temperature using a solution in a suitable solvent such as acetonitrile, preferably at a concentration of 1 mM. A customary double-beam UV-VIS spectrometer can for instance be used for the measurement.

It is further preferred that the additive manufacturing composition comprises as least one radical inhibitor such that the photocatalytic reaction proceeds in a controlled manner, and propagation of a radical chain reaction beyond the regions of direct exposure is avoided. Furthermore, the radical inhibitor prevents premature curing of the additive manufacturing composition, thus increasing the shelf life thereof, and window of operability in the additive manufacturing process of the invention. Suitable radical inhibitors include TEMPO, 2,6-Di-tert-butylphenol, Hydroquinone, Phenothiazine, 2,6-Di-tert-butyl-p-cresol, tert-Butylhydroquinone, 2-tert-Butyl-1,4-benzoquinone, 1,4-Benzoquinone. If present, it is preferred that the at least one radical inhibitor is present in an amount of from 0.001 to 1 parts per weight, preferably from 0.01 to 0.5 parts per weight, relative to the total weight of silicone building blocks bearing a plurality of alkenyl groups.

Depending on the application of the 3D-printed silicone product, it may be important for further components to be present in the additive manufacturing compositions.

One such further component may be a pigment, for achieving the manufacture of coloured 3D-printed silicone parts. If present, it is preferred that the pigment is present in an amount of from 0.01 to 5 parts per weight, preferably from 0.01 to 1 parts per weight, relative to the total weight of silicone building blocks bearing a plurality of alkenyl groups.

Another such further component may be a shear thinning filler, preferably selected from pyrogenic silica and silicone powder. If present, it is preferred that the shear thinning filler is present in an amount of from 1 to 60 parts per weight, preferably from 1 to 50 parts per weight, relative to the total weight of silicone building blocks bearing a plurality of alkenyl groups.

The shear thinning filler becomes an essential component when the shear thinning characteristics of the additive manufacturing composition are important, which itself depends on the precise method of additive manufacturing.

Such shear thinning fillers are also beneficial for stabilizing emulsions, as discussed above.

Yet another such further component may be silicone rubber powder, a reinforcing filler to increase shore hardness and tear strength. If present, it is preferred that the silicone rubber powder is present in an amount of from 1 to 30 parts per weight, relative to the total weight of silicone building blocks bearing a plurality of alkenyl groups.

It is particularly preferred that the only polymers present in the additive manufacturing composition are silicones. It is also preferred that the only polymers present in the 3D-printed silicone part obtainable by the method of the present invention are silicones.

The Heat Promoted Radical Curing Step

In one embodiment, the at least one further curing step of step c) of the present invention is a heat promoted radical curing step.

In the context of the present invention, the term heat promoted radical curing step refers to any step by which a radical reaction is promoted by the heating of the preproduct for a sustained period of time, wherein the radical reaction is promoted by a thermally activatable free radical initiator (E).

As such, when the at least one further curing step of step c) is a heat promoted radical curing step, the additive manufacturing composition of step b) must comprise a thermally activatable free radical initiator.

The thermally activatable free radical initiator (E) is preferably present in an amount in the range from 0.1 to 5.0 parts per weight, more preferably 0.2 to 3.0 parts per weight, relative to the total weight of silicone building blocks bearing a plurality of alkenyl groups.

The thermally activatable free radical initiator (E) according to the present invention is preferably selected from diazo compounds and peroxides, more preferably 2,4-dichlorobenzoyl peroxide, 2,5-bis(tert-butylperoxy)-2,5-dimethyl hexane and 2,2'-azobis(N-butyl-2-methylpropionamide).

The heat promoted radical curing step preferably consists of heating the preproduct at a constant temperature in the range from 30 to 200° C., preferably from 40° C. to 200° C., for a time period in the range from 1 second to 24 h, preferably from 1 min to 24 h.

In one embodiment, the heating can take place at a relatively low temperature for a relatively long time period, preferably at a constant temperature in the range from 30 to 90° C., more preferably in the range from 40 to 80° C., most preferably in the range from 50 to 70° C., and a time period in the range from 12 to 24 h, more preferably in the range from 14 to 21 h, most preferably in the range from 15 to 18 h.

In an alternative embodiment, the heating can take place at a relatively high temperature for a relatively short time period, preferably at a constant temperature in the range from 90 to 200° C., more preferably in the range from 100 to 150° C., most preferably in the range from 110 to 130° C., and a time period in the range from 1 min to 6.0 h, more preferably in the range from 0.5 to 4.5 h, most preferably in the range from 1.0 h to 3.0 h.

The present invention is therefore further directed to an additive manufacturing composition comprising:

i) at least one silicone building block bearing a plurality of alkenyl groups (A);
ii) a crosslinking agent bearing a plurality of thiol groups (B);
iii) at least one free radical photoinitiator (D), preferably in an amount in the range from 0.01 to 3.0 parts per weight, more preferably in the range from 0.1 to 2.0 parts per weight, relative to the total weight of silicone building blocks bearing a plurality of alkenyl groups;
iv) a thermally activatable free radical initiator (E) in an amount in the range from 0.1 to 5.0 parts per weight, preferably 0.2 to 3.0 parts per weight, relative to the total weight of silicone building blocks bearing a plurality of alkenyl groups;

wherein the ratio of thiol groups to alkenyl groups in the composition is in the range from 0.5:1 to 5:1.

All preferable embodiments and features of the additive manufacturing composition given in the sections above and below are equally applicable to the additive manufacturing composition of the present aspect.

Preferably, the additive manufacturing composition of the present aspect is suitable for the method for preparing a 3D-printed silicone of the present invention.

The Silanol Condensation Curing Step

In a further embodiment, the at least one further curing step of step c) of the present invention is a silanol condensation curing step.

In the context of the present invention, the term silanol condensation curing step refers to any step wherein an extended polysiloxane is formed from polysiloxane monomers (C1a) that react with one another, and with silanol crosslinkers (C1b), through a silanol condensation reaction. In the context of the present invention, a blend of polysiloxane monomers suitable for undergoing a silanol condensation reaction to form an extended polysiloxane, and silanol crosslinkers are termed a condensation cure silicone blend.

As such, when the at least one further curing step of step c) is a silanol condensation curing step, the additive manufacturing composition of step b) must comprise a condensation cure silicone blend (C1).

The condensation cure silicone blend (C1) is preferably present in an amount in the range from 1 to 90 parts per weight, more preferably in the range from 5 to 75 parts per weight, most preferably in the range from 10 to 60 parts per weight relative to the total weight of silicone building blocks bearing a plurality of alkenyl groups. The inventors have found that the above ranges provide optimal mechanical performance of the final product. In particular, higher amounts of condensation cure silicone blend (C1) tend to produce mechanically unstable preproducts.

When a condensation cure silicone blend (C1) is employed, two interwoven networks are formed, the first being derived from components (A) and (B) and the second derived from condensation cure silicone blend (C1). Preferably, the condensation cure silicone blend (C1) is present in an amount in the range from 1.0 to 50.0 wt.-%, more preferably in the range from 10.0 to 45.0 wt.-%, yet more preferably in the range from 20.0 to 40.0 wt.-%, most preferably in the range from 20.0 to 39.0 wt.-%, relative to the total weight of (A)+ (B)+ (C1), i.e. the total weight of silicone building blocks bearing a plurality of alkenyl groups, the total weight of cross linking agents bearing a plurality of thiol groups and the total weight of the condensation cure silicone blend. Similarly to the ranges expressed in parts per weight, the ranges expressed in wt.-% are important for improving the mechanical performance of the final product. Furthermore, the mechanical properties of the intermediate part-cured preproducts have notably improved mechanical properties and stability, meaning that particularly complex 3D shapes, requiring high resolution, can be manufactured.

The condensation cure silicone building blocks (C1a) are preferably selected from silanol (Si—OH) terminated polysiloxanes.

The condensation cure silicone building blocks (C1a) preferably have a viscosity of less than 1,000 Pa*s, preferably of less than 100 Pa*s, more preferably of less than 50 Pa*s.

The condensation cure silicone building blocks (C1a) preferably have a weight average molecular weight (Mw) in the range from 100 to 500,000, more preferably in the range from 2,000 to 50,000.

Exemplary condensation cure silicone building blocks (C1a) may be selected from the Polymer OH portfolio, commercially available from Evonik, or DMS-S27, commercially available from Gelest.

In the broadest sense, the silanol crosslinkers (C1b) of the present invention would be understood to be any molecule capable of crosslinking the condensation cure silicone building blocks (C1a). It would be well understood by the person skilled in the art that when the condensation cure silicone building blocks contain silanol functionality, then the silanol crosslinkers (C1b) need only contain suitable leaving groups to achieve the crosslinking, whereas when the condensation cure silicone building blocks (C1a) comprise leaving groups, then the silanol crosslinkers (C1b) would contain silanol functionality. The term "silanol crosslinkers" does not necessarily require that the crosslinker contains silanol functionality; rather that the crosslinker has suitable functionality for forming silanol crosslinks. The suitable functionality would be well understood by a person skilled in the art.

The silanol crosslinkers (C1b) according to the present invention are preferably selected from small molecule silanol crosslinkers and polymeric/oligomeric silanol crosslinkers.

Small molecule silanol crosslinkers are preferably selected from compounds according to formula (II)

$$(R')_m Si(R)_n \tag{II}$$

wherein R is selected from H, alkyl, alkenyl, cycloalkyl, aryl and heteroaryl; wherein R' may be any group capable of behaving as a leaving group in a silanol condensation reaction, more preferably selected from carboxylate groups, alkenyloxy groups, oxime groups, alkoxy groups and dialkylamino groups, yet more preferably alkoxy groups, in particular C(1-6)alkoxy groups, most preferably ethoxy;

wherein each instance of R and R' may be the same or different; and wherein m is either 3 or 4, n is either 0 or 1 and m+n=4.

In an alternative embodiment, the small molecule silanol crosslinkers are preferably selected from compounds according to formula (IIa)

$$(R')_m Si(R)_n \tag{IIa}$$

wherein R is selected from H, alkyl, alkenyl, cycloalkyl, aryl and heteroaryl;

wherein R' may be any group capable of behaving as a leaving group in a silanol condensation reaction, more preferably selected from carboxylate groups, alkenyloxy groups, oxime groups, alkoxy groups and dialkylamino groups, yet more preferably alkenoxy groups, most preferably isopropenoxy;

wherein each instance of R and R' may be the same or different; and wherein m is either 3 or 4, n is either 0 or 1 and m+n=4.

Polymeric/oligomeric silanol crosslinkers are typically polyalkylsilicate polymers/oligomers according to formula (III)

$$R^1O((R^3O)R^4SiO)_xR^2 \tag{III}$$

wherein $R^1$, $R^2$, and $R^3$ are independently C (1-6)alkyl, preferably $R^1$, $R^2$, and $R^3$ are the same, and most preferably are ethyl;

$R^4$ is selected from C (1-6)alkyl, and C (1-6)alkenyl, preferably methyl, ethyl, vinyl and isopropenyl; and x is preferably from 2 to 100.

Commercially available polyalkylsilicates are typically supplied as a mixture of monomers, dimers, trimers and cyclic polysiloxanes. These mixtures correspond to a combination of compounds according to formulae (II) and (III).

The ratio of crosslinker groups (i.e. R' for the small molecule silanol crosslinkers, and $OR^1$, $OR^2$ and $OR^3$ for the polymeric/oligomeric silanol crosslinkers) to silanol (Si—OH) groups of the condensation cure silicone building blocks (C1a) in the additive manufacturing composition is preferably in the range from 0.5:1 to 50:1.

The silanol condensation curing step preferably consists of exposing the preproduct to a relative humidity of greater than 20%, preferably of greater than 50%, for a time period in the range from 30 min to 72 h, preferably from 6 to 36 h.

Particularly preferred are conditions wherein the relative humidity is greater than 50% for a time period in the range from 12 to 36 h, more preferably from 18 to 30 h, most preferably in the range from 22 to 26 h.

Whilst the silanol condensation reaction can take place in the presence of moisture alone, it is sometime beneficial for the additive manufacturing composition of step b) to further comprise a silanol condensation catalyst. In the context of the present invention, a silanol condensation catalyst is any species capable of catalysing a silanol condensation reaction.

The silanol condensation catalyst of the present invention is preferably selected from group of complexes of tin, titanium, zinc, iron, lead or cobalt, or aromatic organic sulfonic acids.

It is most preferred that the silanol condensation catalyst is selected from tin and titanium complexes.

Exemplary silanol condensation catalysts suitable for the present invention include dimethylhydroxy (oleate) tin, dibutyltin dilaurate and titanium diisopropoxide bis(ethylacetoacetate).

The silanol condensation catalyst of the present invention is preferably present in an amount of from 0.1 to 5.0 parts per weight, relative to the total weight of silicone building blocks bearing a plurality of alkenyl groups.

The 3D-printed silicone products of the present embodiment are best visualised as an interwoven network of silicone that has been cured in step b) via a thiol-ene reaction and the extended polysiloxane formed in the silanol condensation curing step c). These two interwoven silicone networks complement each other and contribute to the improved mechanical properties of the 3D-printed silicone product, however the two networks are not chemically bonded to one another.

In certain situations, it may be advantageous to further improve the mechanical properties through the introduction of chemical bonds between the two interwoven silicone networks.

One strategy to achieve this crosslinking is through the use of condensation cure silicone building blocks (C1a) having thiol (—SH) functionality.

Another method is through the incorporation of small molecule silane coupling agents, having both silanol cross coupling functionality (analogous to the silanol crosslinker (C1b)) and either alkenyl or thiol functionality.

These small molecules will be incorporated into the matrix formed in step b) through the thiol-ene reaction. During the silanol condensation curing step, the matrix thus contains reactive functional groups that can react with the condensation cure silicone blend (C1), resulting in a crosslinked structure whereby the two interwoven silicone networks are crosslinked with one another.

Suitable small molecule silanol coupling agents are selected from alkenyl silane coupling agents (C2) and thiol-containing silane coupling agents (C3).

The alkenyl silane coupling agent (C2) of the present invention is preferably described by formula (IV):

$$(R')_m Si(R'')_n R \quad \text{(IV)}$$

wherein R is a vinyl, allyl, butenyl or pentenyl group, preferably a vinyl group;

wherein R' may be any group capable of behaving as a leaving group in a silanol condensation reaction, more preferably selected from carboxylate groups, alkenyloxy groups, oxime groups, alkoxy groups and dialkylamino groups, yet more preferably alkoxy groups, in particular C (1-6)alkoxy groups, most preferably ethoxy;

R" is selected from C (1-6)alkyl, and C (1-6)alkenyl, preferably methyl, ethyl, vinyl and isopropenyl, most preferably methyl; and wherein m is either 2 or 3, n is either 0 or 1 and m+n=3.

In an alternative embodiment, alkenyl silane coupling agent (C2) of the present invention is described by formula (IVa):

$$(R')_m Si(R'')_n R \quad \text{(IVa)}$$

wherein R is a vinyl, allyl, butenyl or pentenyl group, preferably a vinyl group;

wherein R' may be any group capable of behaving as a leaving group in a silanol condensation reaction, more preferably selected from carboxylate groups, alkenyloxy groups, oxime groups, alkoxy groups and dialkylamino groups, yet more preferably alkenoxy groups, in particular C (1-6)alkenoxy groups, most preferably isopropenoxy;

R" is selected from C (1-6)alkyl, and C (1-6)alkenyl, preferably methyl, ethyl, vinyl and isopropenyl, most preferably methyl; and wherein m is either 2 or 3, n is either 0 or 1 and m+n=3.

The thiol-containing silane coupling agent (C3) of the present invention is preferably described by formula (V):

$$(R^a)_m Si(R^b)_n R \quad \text{(V)}$$

wherein R is a mercapto-C(1-12)alkyl, preferably mercapto-C(1-6)alkyl, most preferably mercatpto-propyl;

wherein $R^a$ may be any group capable of behaving as a leaving group in a silanol condensation reaction, more preferably selected from carboxylate groups, alkenyloxy groups, oxime groups, alkoxy groups and dialkylamino groups, yet more preferably alkoxy groups, in particular C (1-6)alkoxy groups, most preferably ethoxy;

$R^b$ is selected from C (1-6)alkyl, and C (1-6)alkenyl, preferably methyl, ethyl, vinyl and isopropenyl, most preferably methyl; and wherein m is either 2 or 3, n is either 0 or 1 and m+n=3.

In an alternative embodiment, the thiol-containing silane coupling agent (C3) of the present invention is preferably described by formula (Va):

$$(R^a)_m Si(R^b)_n R \quad \text{(Va)}$$

wherein R is a mercapto-C(1-12)alkyl, preferably mercapto-C(1-6)alkyl, most preferably mercatpto-propyl;

wherein $R^a$ may be any group capable of behaving as a leaving group in a silanol condensation reaction, more preferably selected from carboxylate groups, alkenyloxy groups, oxime groups, alkoxy groups and dialkylamino groups, yet more preferably alkenoxy groups, in particular C (1-6)alkenoxy groups, most preferably isopropenoxy;

$R^b$ is selected from C (1-6)alkyl, and C (1-6)alkenyl, preferably methyl, ethyl, vinyl and isopropenyl, most preferably methyl; and wherein m is either 2 or 3, n is either 0 or 1 and m+n=3.

In one embodiment, the selection of either R' (for (C2)) or $R^a$ (for (C3)) as ethoxy is preferable. In another embodiment, the selection of either R' (for (C2)) or $R^a$ (for (C3)) as isopropenoxy is preferable. These particular leaving groups are preferable, since they allow the silanol moiety to be sufficiently reactive to efficiently undergo the silanol condensation reaction during step c), but not so reactive that the silanol condensation reaction would take place in either step b) or in the preparation of the additive manufacturing composition.

The additive manufacturing composition of the present invention may comprise either the alkenyl silane coupling agent (C2) or the thiol-containing silane coupling agent (C3), or a mixture thereof.

It is preferred that the combined amount of alkenyl silane coupling agent (C2) and thiol-containing silane coupling agent (C3) in the additive manufacturing composition is between 1 and 60 parts per weight, more preferably in the range from 1 to 30 parts per weight, most preferably in the range from 1 to 20 parts per weight relative to the total weight of silicone building blocks bearing a plurality of alkenyl groups.

Alternatively, it is preferred that the combined amount of condensation cure silicone blend (C1), alkenyl silane coupling agent (C2) and thiol-containing silane coupling agent (C3) is in the range from 1.0 to 50.0 wt.-%, more preferably in the range from 10.0 to 45.0 wt.-%, yet more preferably in the range from 20.0 to 40.0 wt.-%, most preferably in the range from 20.0 to 39.0 wt.-%, relative to the total weight of (A)+ (B)+ (C1)+ (C2)+ (C3), i.e. the total weight of silicone building blocks bearing a plurality of alkenyl groups, the total weight of cross linking agents bearing a plurality of thiol groups and the total weight of the condensation cure silicone blend including any alkenyl and/or thiol-containing silane coupling agents ([(C1)+ (C2)+ (C3)]/[(A)+ (B)+ (C1)+ (C2)+ (C3)]).

The ratio of alkenyl silane coupling agent (C2) to thiol-containing silane coupling agent (C3) in the additive manufacturing composition of the present invention is unimportant, so long as the overall ratio of thiol groups to alkenyl groups in the additive manufacturing composition is in the range from 0.5:1 to 5:1 and the ratio of the crosslinker groups present in the silanol crosslinkers (C1b), alkenyl silane coupling agents (C2) and the thiol-containing silane coupling agents (C3) to the silanol (Si—OH) groups in the condensation cure silicone building blocks (C1a) are in the range from 0.5:1 to 50:1

The present invention is therefore further directed to an additive manufacturing composition comprising:

i) at least one silicone building block bearing a plurality of alkenyl groups (A);
ii) a crosslinking agent bearing a plurality of thiol groups (B);
iii) a condensation cure silicone blend (C1), preferably in an amount in the range from 1 to 90 parts per weight, relative to the total weight of silicone building blocks bearing a plurality of alkenyl groups;
iv) at least one free radical photoinitiator (D) preferably in an amount in the range from 0.01 to 3.0 parts per weight, more preferably in the range from 0.1 to 2.0 parts per weight, relative to the total weight of silicone building blocks bearing a plurality of alkenyl groups;

wherein the ratio of thiol groups to alkenyl groups in the composition is in the range from 0.5:1 to 5:1.

All preferable embodiments and features of the additive manufacturing composition given in the sections above and below are equally applicable to the additive manufacturing composition of the present aspect.

Preferably the additive manufacturing composition of the present aspect is suitable for the method for preparing a 3D-printed silicone of the present invention.

Combination of Heat Promoted Radical Curing Step and Silanol Condensation Curing Step In a particularly preferred embodiment step c) of the method for preparing a 3D-printed silicone comprises both a heat promoted radical curing step and a silanol condensation curing step.

The heat promoted radical curing step and silanol condensation curing step may be carried out sequentially, however it is preferred that the two steps take place simultaneously. The conditions for such a simultaneous combination of the two steps involves heating of the preproduct at a constant temperature in the range from 50 to 150° C. for a time period in the range from 1 to 24 h at a relative humidity of greater than 50%.

In one embodiment, the heating can take place at a relatively low temperature for a relatively long time period, preferably at a constant temperature in the range from 50 to 80° C., more preferably in the range from 53 to 70° C., most preferably in the range from 55 to 65° C., over a time period in the range from 12 to 24 h, more preferably in the range from 14 to 21 h, most preferably in the range from 15 to 18 h, and at a relative humidity of greater than 50%.

In an alternative embodiment, the heating can take place at a relatively high temperature for a relatively short time period, preferably at a constant temperature in the range from 90 to 150° C., more preferably in the range from 100 to 140° C., most preferably in the range from 110 to 130° C., over a time period in the range from 1 to 6 h, more preferably in the range from 1.5 to 4.5 h, most preferably in the range from 1.5 to 3 h, and at a relative humidity of greater than 50%.

If step c) of the method for preparing a 3D-printed silicone according to the present invention comprises both a heat promoted radical curing step and a silanol condensation curing step, then the additive manufacturing composition of step b) must comprise:

i) at least one silicone building block bearing a plurality of alkenyl groups (A);
ii) a crosslinking agent bearing a plurality of thiol groups (B);
iii) a condensation cure silicone blend (C1), preferably in an amount in the range from 1 to 90 parts per weight, relative to the total weight of silicone building blocks bearing a plurality of alkenyl groups;
iv) at least one free radical photoinitiator (D) preferably in an amount in the range from 0.01 to 3.0 parts per weight, more preferably in the range from 0.1 to 2.0 parts per weight, relative to the total weight of silicone building blocks bearing a plurality of alkenyl groups; and
v) a thermally activatable free radical initiator (E) in an amount in the range from 0.1 to 5.0 parts per weight, preferably 0.2 to 3.0 parts per weight, relative to the total weight of silicone building blocks bearing a plurality of alkenyl groups;

wherein the ratio of thiol groups to alkenyl groups in the composition is in the range from 0.5:1 to 5:1.

All preferable embodiments of the additive manufacturing composition discussed in previous sections apply equally to the additive manufacturing composition of the present aspect.

Article and Use

The present invention is furthermore directed to 3D-printed silicone products obtainable through the method of the present invention.

One of the primary advantages of the invention over methods which only use UV/visible light-curing is the depth of the curing, resulting in homogeneous curing with isotropic material properties, even for relatively massive preproducts.

As such, the present invention is directed to a 3D-printed silicone, obtainable by the method of the present invention, being at least 1×1×1 mm in size, preferably at least 3×3×3 mm, most preferably at least 5×5×5 mm, wherein the variation of the numerical value of Shore A hardness, measured according to ISO 7619-1, between samples taken from the surface of the cured composition and the centre of the cured composition differ by less than 10%, preferably by less than 5%, most preferably the numerical values are the same.

The present invention is furthermore directed to the use of a thermally activatable free radical initiator (E) in a process comprising the steps of:

a) preparation of a 3D model of a preproduct;

b) additive manufacturing of the preproduct according to the 3D model of the preproduct using an additive manufacturing device and an additive manufacturing composition comprising
  i) at least one silicone building block bearing a plurality of alkenyl groups (A);
  ii) a crosslinking agent bearing a plurality of thiol groups (B);
  iii) at least one free radical photoinitiator (D), preferably in an amount in the range from 0.01 to 3.0 parts per weight, more preferably in the range from 0.1 to 2.0 parts per weight, relative to the total weight of silicone building blocks bearing a plurality of alkenyl groups;

wherein the ratio of thiol groups to alkenyl groups in the composition is in the range from 0.5:1 to 5:1;

c) post-curing treatment comprising a heat promoted radical curing step, wherein the preproduct is preferably heated at a constant temperature in the range from 50° C. to 150° C. for a time period in the range from 1 to 24 h;

wherein the thermally activatable free radical initiator (E) is preferably present in the additive manufacturing composition of step b) in an amount in the range from 0.1 to 5.0 parts per weight, preferably 0.2 to 3.0 parts per weight, relative to the total weight of silicone building blocks bearing a plurality of alkenyl groups; for the production of 3D-printed silicone having one of more of the following properties:

a) a Young's modulus, measured according to ISO 37 on Type 4 tensile specimen, in the range from 110 to 10,000% of the Young's modulus of 3D-printed silicone produced from the same additive manufacturing composition in the absence of the free radical initiator (E) or heat promoted radical curing step, b) an elongation at break, measured according to ISO 37 on Type 4 tensile specimen, in the range from 110 to 1,000% of the elongation at break of 3D-printed silicone produced from the same additive manufacturing composition in the absence of the free radical initiator (E) or heat promoted radical curing step, c) a tensile strength, measured according to ISO 37 on Type 4 tensile specimen, in the range from 110 to 500% of the tensile strength of 3D-printed silicone produced from the same additive manufacturing composition in the absence of the free radical initiator (E) or heat promoted radical curing step, d) a tear strength, measured according to ASTM D624 on samples of Specimen Type C, in the range from 110 to 400% of the tear strength of 3D-printed silicone produced from the same additive manufacturing composition in the absence of the free radical initiator (E) or heat promoted radical curing step, e) a Shore A hardness, measured according to ISO 7619-1, wherein the numerical value is in the range from 110 to 2,500% of the numerical value of the Shore A hardness of 3D-printed silicone produced from the same additive manufacturing composition in the absence of the free radical initiator (E) or heat promoted radical curing step.

In a final aspect, the present invention is directed to the use of a condensation cure silicone blend (C1) in a process comprising the steps of:

a) preparation of a 3D model of a preproduct;

b) additive manufacturing of the preproduct according to the 3D model of the preproduct using an additive manufacturing device and an additive manufacturing composition comprising:
  i) at least one silicone building block bearing a plurality of alkenyl groups (A);
  ii) a crosslinking agent bearing a plurality of thiol groups (B);
  iii) at least one free radical photoinitiator (D), preferably in an amount in the range from 0.01 to 3.0 parts per weight, more preferably in the range from 0.1 to 2.0 parts per weight, relative to the total weight of silicone building blocks bearing a plurality of alkenyl groups;

wherein the ratio of thiol groups to alkenyl groups in the composition is in the range from 0.5:1 to 5:1;

c) post-curing treatment comprising a silanol condensation curing step, preferably consisting of exposing the preproduct to a relative humidity of greater than 20%, preferably of greater than 50%, for a time period in the range from 30 min to 72 h, preferably from 6 to 36 h;

wherein the condensation cure silicone blend (C1) is preferably present in the additive manufacturing composition of step b) in an amount in the range from 1 to 90 parts per weight, relative to the total weight of silicone building blocks bearing a plurality of alkenyl groups;

for the production of 3D-printed silicone having one of more of the following properties:

a) a Young's modulus, measured according to ISO 37 on Type 4 tensile specimen, in the range from 110 to 10,000% of the Young's modulus of 3D-printed silicone produced from the same additive manufacturing composition in the absence of the condensation cure silicone blend (C1) or silanol condensation curing step, b) an elongation at break, measured according to ISO 37 on Type 4 tensile specimen, in the range from 110 to 1,000% of the elongation at break of 3D-printed silicone produced from the same additive manufacturing composition in the absence of the condensation cure silicone blend (C1) or silanol condensation curing step, c) a tensile strength, measured according to ISO 37 on Type 4 tensile specimen, in the range from 110 to 500% of the tensile strength of 3D-printed silicone produced from the same additive manufacturing composition in the absence of the condensation cure silicone blend (C1) or silanol condensation curing step, d) a tear strength, measured according to ASTM D624 on Type 4 tensile specimen, in the range from 110 to 400% of the tear strength of 3D-printed silicone produced from the same additive manufacturing composition in the absence of the condensation cure silicone blend (C1) or silanol condensation curing step, e) a Shore A hardness, measured according to ISO 7619-1, wherein the numerical value is in the range from 110 to 2,500% of the numerical value of the Shore A hardness of 3D-printed silicone produced from the same additive manufacturing composition in the absence of the condensation cure silicone blend (C1) or silanol condensation curing step.

All preferable embodiments and features of both the method and the additive manufacturing composition as given in the sections above are equally applicable for both the article and the uses discussed in the present section.

The present invention may also be described by the following items:

1. A method for preparing a 3D-printed silicone comprising:
   a) preparation of a 3D model of a preproduct;
   b) additive manufacturing of the preproduct according to the 3D model of the preproduct using an additive manufacturing device and an additive manufacturing composition comprising:
      i) at least one silicone building block bearing a plurality of alkenyl groups (A);
      ii) at least one crosslinking agent bearing a plurality of thiol groups (B);
      iii) at least one free radical photoinitiator (D);
   c) post-curing treatment that comprises at least one further curing step other than light-promoted curing, preferably either heat promoted radical curing or silanol condensation curing;

wherein the ratio of thiol groups to alkenyl groups in the additive manufacturing composition is in the range from 0.5:1 to 5:1.
2. The method according to item 1, wherein the at least one silicone building block bearing a plurality of alkenyl groups (A) and the crosslinking agent bearing a plurality of thiol groups (B) form a stable emulsion.
3. The method according to item 1, wherein the at least one silicone building block bearing a plurality of alkenyl groups (A) and the crosslinking agent bearing a plurality of thiol groups (B) form a continuous phase.
4. The method according to any one of items 1 to 3, wherein the additive manufacturing composition has a viscosity in the range from more than 1 to 2'000 Pa*s, more preferably in the range from 30 to 700 Pa*s, most preferably in the range from 50 to 300 Pa*s.
5. The method according to any one of items 1 to 4, wherein the alkenyl groups in the at least one silicone building block bearing a plurality of alkenyl groups (A) are selected from vinyl, allyl, butenyl or pentenyl.
6. The method according to any one of items 1 to 4, wherein the alkenyl groups in the at least one silicone building block bearing a plurality of alkenyl groups (A) are vinyl groups.
7. The method according to any one of items 1 to 6, wherein the at least one crosslinking agent bearing a plurality of thiol groups (B) is described by formula (I):

$$R^1(R)_2SiO((R^3R)SiO)_xSi(R)_2R^2 \quad (I)$$

wherein R is independently C (1-12)alkyl, preferably methyl;

$R^1$, $R^2$, $R^3$ are independently C (1-12)alkyl, preferably methyl, or mecapto-C (1-12)alkyl;

wherein each instance of $R^3$ may be the same (i.e. homopolymer) or different (i.e. copolymer); and x is 1 or more, preferably 1 to 100, with the proviso that at least one, preferably 10 to 100'000, of $R^1$, $R^2$, $R^3$ is mercapto-C(1-12)alkyl.
8. The method according to any one of items 1 to 7, wherein the additive manufacturing composition further comprises:
   iv) a shear thinning filler, preferably selected from pyrogenic silica and silicone powder, in an amount in the range from 1 to 60 parts per weight, relative to the total weight of the silicone building blocks bearing a plurality of alkenyl groups.
9. The method according to any one of items 1 to 8, wherein the at least one free radical photoinitiator (D) is present in an amount in the range from 0.01 to 3.0 parts per weight, preferably in the range from 0.1 to 2.0 parts per weight, relative to the total weight of silicone building blocks bearing a plurality of alkenyl groups.
10. The method according to any one of items 1 to 9, wherein the additive manufacturing composition further comprises:
   v) a thermally activatable free radical initiator (E), preferably present in an amount in the range from 0.1 to 5.0 parts per weight, more preferably 0.2 to 3.0 parts per weight, relative to the total weight of silicone building blocks bearing a plurality of alkenyl groups; and wherein the at least one further curing step of step c) is a heat promoted radical curing step.
11. The method according to item 10, wherein the heat promoted radical curing step consists of heating the preproduct at a constant temperature in the range from 30° C. to 200° C. for a time period in the range from 1 second to 24 h.
12. The method according to items 10 or 11 wherein the thermally activatable free radical initiator (E) is selected from diazo compounds and peroxides, more preferably 2,4-dichlorobenzoyl peroxide, 2,5-bis(tert-butylperoxy)-2,5-dimethyl hexane and 2,2'-azobis(N-butyl-2-methylpropionamide).
13. The method according to any one of items 1 to 12, wherein the additive manufacturing composition further comprises:
   vi) a condensation cure silicone blend (C1), preferably in an amount in the range from 1 to 90 parts per weight, relative to the total weight of silicone building blocks bearing a plurality of alkenyl groups; and wherein the at least one further curing step of step c) is a silanol condensation curing step, and wherein the condensation cure silicone blend (C1) is a blend of condensation cure silicone building blocks (C1a), preferably selected from silanol terminated polysiloxanes, and silanol crosslinkers (C1b), preferably selected from small molecule silanol crosslinkers and polymeric/oligomeric silanol crosslinkers.

14. The method according to item 13, wherein the silanol crosslinkers (C1b) are small molecule silanol crosslinkers selected from compounds according to formula (II)

$$(R')_m Si(R)_n \quad (II)$$

wherein R is selected from H, alkyl, alkenyl, cycloalkyl, aryl and heteroaryl; wherein R' may be any group capable of behaving as a leaving group in a silanol condensation reaction, more preferably selected from carboxylate groups, alkenyloxy groups, oxime groups, alkoxy groups and dialkylamino groups, yet more preferably alkoxy groups, in particular C (1-6)alkoxy groups, most preferably ethoxy;

wherein each instance of R and R' may be the same or different; and wherein m is either 3 or 4, n is either 0 or 1 and m+n=4.

15. The method according to item 12, wherein the silanol crosslinkers (C1b) are small molecule silanol crosslinkers selected from compounds according to formula (IIa)

$$(R')_m Si(R)_n \quad (IIa)$$

wherein R is selected from H, alkyl, alkenyl, cycloalkyl, aryl and heteroaryl; wherein R' may be any group capable of behaving as a leaving group in a silanol condensation reaction, more preferably selected from carboxylate groups, alkenyloxy groups, oxime groups, alkoxy groups and dialkylamino groups, yet more preferably alkenoxy groups, most preferably isopropenoxy; wherein each instance of R and R' may be the same or different; and wherein m is either 3 or 4, n is either 0 or 1 and m+n=4.

16. The method according to any one of items 12 to 15, wherein the silanol condensation curing step consists of exposing the preproduct to a relative humidity of greater than 20%, preferably of greater than 50%, for a time period in the range from 30 min to 72 h, preferably from 6 to 36 h.

17. The method according to any one of items 12 to 16, wherein the ratio of crosslinker groups to silanol groups of the condensation cure silicone building blocks (C1a) in the additive manufacturing composition is in the range from 0.5:1 to 50:1.

18. The method according to any one of items 12 to 17, wherein the condensation cure silicone blend (C1) is present in an amount in the range from 1 to 90 parts per weight, more preferably in the range from 5 to 75 parts per weight, most preferably in the range from 10 to 60 parts per weight relative to the total weight of silicone building blocks bearing a plurality of alkenyl groups.

19. The method according to any one of items 12 to 17, wherein the condensation cure silicone blend (C1) is present in an amount in the range from 1.0 to 50.0 wt.-%, more preferably in the range from 10.0 to 45.0 wt.-%, yet more preferably in the range from 20.0 to 40.0 wt.-%, most preferably in the range from 20.0 to 39.0 wt.-%, relative to the total the total weight of silicone building blocks bearing a plurality of alkenyl groups, the total weight of cross linking agents bearing a plurality of thiol groups and the total weight of the condensation cure silicone blend.

20. The method according to any one of items 12 to 19, wherein the additive manufacturing composition further comprises:

vii) an alkenyl silane coupling agent (C2), and/or viii) thiol-containing silane coupling agent (C3), preferably in a combined amount of from 1 to 60 parts per weight, relative to the total weight of silicone building blocks bearing a plurality of alkenyl groups.

21. The method according to any one of items 12 to 19, wherein the additive manufacturing composition further comprises:

vii) an alkenyl silane coupling agent (C2) described by formula (IV):

$$(R')_m Si(R'')_n R \quad (IV)$$

wherein R is a vinyl, allyl, butenyl or pentenyl group, preferably a vinyl group;

wherein R' may be any group capable of behaving as a leaving group in a silanol condensation reaction, more preferably selected from carboxylate groups, alkenyloxy groups, oxime groups, alkoxy groups and dialkylamino groups, yet more preferably alkoxy groups, in particular C (1-6)alkoxy groups, most preferably ethoxy;

R" is selected from C (1-6)alkyl and C (1-6)alkenyl, preferably methyl, ethyl, vinyl or isopropenyl, most preferably methyl;

and wherein m is either 2 or 3, n is either 0 or 1 and m+n=3;

and/or viii) thiol-containing silane coupling agent (C3) described by formula (V):

$$(R^a)_m Si(R^b)_n R \quad (V)$$

wherein R is a mercapto-C(1-12)alkyl, preferably mercapto-C (1-6)alkyl, most preferably mercatpto-propyl;

wherein $R^a$ may be any group capable of behaving as a leaving group in a silanol condensation reaction, more preferably selected from carboxylate groups, alkenyloxy groups, oxime groups, alkoxy groups and dialkylamino groups, yet more preferably alkoxy groups, in particular C (1-6)alkoxy groups, most preferably ethoxy;

$R^b$ is selected from C (1-6)alkyl and C (1-6)alkenyl, preferably methyl, ethyl, vinyl and isopropenyl, most preferably methyl;

and wherein m is either 2 or 3, n is either 0 or 1 and m+n=3 preferably in a combined amount of from 1 to 60 parts per weight, relative to the total weight of silicone building blocks bearing a plurality of alkenyl groups.

22. The method according to any one of items 12 to 19, wherein the additive manufacturing composition further comprises:

vii) an alkenyl silane coupling agent (C2) described by formula (IVa):

$$(R')_m Si(R'')_n R \quad (IVa)$$

wherein R is a vinyl, allyl, butenyl or pentenyl group, preferably a vinyl group;

wherein R' may be any group capable of behaving as a leaving group in a silanol condensation reaction, more preferably selected from carboxylate groups, alkenyloxy groups, oxime groups, alkoxy groups and dialkylamino groups, yet more preferably alkenoxy groups, in particular C (1-6)alkenoxy groups, most preferably isopropenoxy;

R" is selected from C (1-6)alkyl and C (1-6)alkenyl, preferably methyl, ethyl, vinyl or isopropenyl, most preferably methyl;

and wherein m is either 2 or 3, n is either 0 or 1 and m+n=3;

and/or viii) thiol-containing silane coupling agent (C3) described by formula (Va):

$$(R^a)_m Si(R^b)_n R \quad \text{(Va)}$$

wherein R is a mercapto-C(1-12)alkyl, preferably mercapto-C (1-6)alkyl, most preferably mercatpto-propyl;

wherein $R^a$ may be any group capable of behaving as a leaving group in a silanol condensation reaction, more preferably selected from carboxylate groups, alkenyloxy groups, oxime groups, alkoxy groups and dialkylamino groups, yet more preferably alkenoxy groups, in particular C (1-6)alkenoxy groups, most preferably isopropenoxy;

$R^b$ is selected from C (1-6)alkyl and C (1-6)alkenyl, preferably methyl, ethyl, vinyl and isopropenyl, most preferably methyl;

and wherein m is either 2 or 3, n is either 0 or 1 and m+n=3 preferably in a combined amount of from 1 to 60 parts per weight, relative to the total weight of silicone building blocks bearing a plurality of alkenyl groups.

23. The method according to any one of items 20 to 22, wherein the combined amount of condensation cure silicone blend (C1), alkenyl silane coupling agent (C2) and thiol-containing silane coupling agent (C3) is in the range from 1.0 to 50.0 wt.-%, more preferably in the range from 10.0 to 45.0 wt.-%, yet more preferably in the range from 20.0 to 40.0 wt.-%, most preferably in the range from 20.0 to 39.0 wt.-%, relative to the total weight of (A)+ (B)+(C1)+ (C2)+ (C3), i.e. the total weight of silicone building blocks bearing a plurality of alkenyl groups, the total weight of cross linking agents bearing a plurality of thiol groups and the total weight of the condensation cure silicone blend including any alkenyl and/or thiol-containing silane coupling agents ([(C1)+ (C2)+ (C3)]/[(A)+ (B)+ (C1)+ (C2)+ (C3)]).

24. The method according to any one of items 12 to 23, wherein the additive manufacturing composition further comprises:

ix) a silanol condensation catalyst (F), preferably in an amount of from 0.1 to 5.0 parts per weight, relative to the total weight of silicone building blocks bearing a plurality of alkenyl groups;

wherein the silanol condensation catalyst (F) is preferably selected from the group of complexes of tin, titanium, zinc, iron, lead or cobalt, or aromatic organic sulfonic acids, most preferably from the group of tin and titanium complexes.

25. The method according to any one of items 1 to 24 wherein step c) comprises both a heat promoted radical curing step and a silanol condensation curing step, the heat promoted radical curing step and silanol condensation curing step being carried out either separately or simultaneously, wherein if the heat promoted radical curing step and silanol condensation curing step are carried out simultaneously, the combined heating/silanol condensation curing step consists of heating of the preproduct at a constant temperature in the range from 40° C. to 200° C. for a time period in the range from 1 min to 24 h at a relative humidity of greater than 50%.

26. The method according to any one of items 1 to 25, wherein the additive manufacturing device comprises a recoater.

27. The method according to item 26, wherein the additive manufacturing of step b) comprises the steps:

i) Dipping the platform into the additive manufacturing composition at a predefined height to apply a layer of the additive manufacturing composition to the platform or to the surface of the emerging preproduct;

ii) Moving the platform such that at least the applied layer of additive manufacturing composition is above the additive manufacturing composition;

iii) Providing a film of the additive manufacturing composition with a predefined thickness by wiping the applied layer of the additive manufacturing composition with the recoater;

iv) Irradiating the applied film of the additive manufacturing composition with the radiation source;

v) Optionally moving the platform in the z-direction.

vi) Optionally repeating steps ii), iii) iv) and/or v).

28. An additive manufacturing composition comprising:

i) at least one silicone building block bearing a plurality of alkenyl groups (A);

ii) a crosslinking agent bearing a plurality of thiol groups (B);

iii) at least one free radical photoinitiator (D), preferably in an amount in the range from 0.01 to 3.0 parts per weight, more preferably in the range from 0.1 to 2.0 parts per weight, relative to the total weight of silicone building blocks bearing a plurality of alkenyl groups;

iv) a thermally activatable free radical initiator (E) in an amount in the range from 0.1 to 5.0 parts per weight, preferably 0.2 to 3.0 parts per weight, relative to the total weight of silicone building blocks bearing a plurality of alkenyl groups;

wherein the ratio of thiol groups to alkenyl groups in the composition is in the range from 0.5:1 to 5:1.

29. An additive manufacturing composition:

i) at least one silicone building block bearing a plurality of alkenyl groups (A);

ii) a crosslinking agent bearing a plurality of thiol groups (B);

iii) a condensation cure silicone blend (C1), preferably in an amount in the range from 1 to 90 parts per weight, relative to the total weight of silicone building blocks bearing a plurality of alkenyl groups;

iv) at least one free radical photoinitiator (D) preferably in an amount in the range from 0.01 to 3.0 parts per weight, more preferably in the range from 0.1 to 2.0 parts per weight, relative to the total weight of silicone building blocks bearing a plurality of alkenyl groups;

wherein the ratio of thiol groups to alkenyl groups in the composition is in the range from 0.5:1 to 5:1.

30. A cured composition obtainable by the method of any one of items 1 to 27, being at least 1×1×1 mm in size, preferably at least 3×3×3 mm, most preferably at least 5×5×5 mm, wherein the variation of the numerical value of Shore A hardness, measured according to ISO 7619-1, between samples taken from the surface of the cured composition and the center of the cured composition differ by less than 10%, preferably by less than 5%, most preferably the numerical values are the same.

31. Use of a thermally activatable free radical initiator (E) in a process comprising the steps of:
   a) preparation of a 3D model of a preproduct;
   b) additive manufacturing of the preproduct according to the 3D model of the preproduct using an additive manufacturing device and an additive manufacturing composition comprising
      i) at least one silicone building block bearing a plurality of alkenyl groups (A);
      ii) a crosslinking agent bearing a plurality of thiol groups (B);
      iii) at least one free radical photoinitiator (D), preferably in an amount in the range from 0.01 to 3.0 parts per weight, more preferably in the range from 0.1 to 2.0 parts per weight, relative to the total weight of silicone building blocks bearing a plurality of alkenyl groups;
   wherein the ratio of thiol groups to alkenyl groups in the composition is in the range from 0.5:1 to 5:1;
   c) post-curing treatment comprising a heat promoted radical curing step, wherein the preproduct is preferably heated at a constant temperature in the range from 50° C. to 150° C. for a time period in the range from 1 to 24 h;

wherein the thermally activatable free radical initiator (E) is preferably present in the additive manufacturing composition of step b) in an amount in the range from 0.1 to 5.0 parts per weight, preferably 0.2 to 3.0 parts per weight, relative to the total weight of silicone building blocks bearing a plurality of alkenyl groups;

for the production of 3D-printed silicone having one of more of the following properties:
   a) a Young's modulus, measured according to ISO 37 on Type 4 tensile specimen, in the range from 110 to 10,000% of the Young's modulus of 3D-printed silicone produced from the same additive manufacturing composition in the absence of the free radical initiator (E) or heat promoted radical curing step,
   b) an elongation at break, measured according to ISO 37 on Type 4 tensile specimen, in the range from 110 to 1,000% of the elongation at break of 3D-printed silicone produced from the same additive manufacturing composition in the absence of the free radical initiator (E) or heat promoted radical curing step,
   c) a tensile strength, measured according to ISO 37 on Type 4 tensile specimen, in the range from 110 to 500% of the tensile strength of 3D-printed silicone produced from the same additive manufacturing composition in the absence of the free radical initiator (E) or heat promoted radical curing step,
   d) a tear strength, measured according to ASTM D624 on sample of Specimen Type C, in the range from 110 to 400% of the tear strength of 3D-printed silicone produced from the same additive manufacturing composition in the absence of the free radical initiator (E) or heat promoted radical curing step,
   e) a Shore A hardness, measured according to ISO 7619-1, in the range from 110 to 2,500% of the Shore A hardness of 3D-printed silicone produced from the same additive manufacturing composition in the absence of the free radical initiator (E) or heat promoted radical curing step.

32. Use of a condensation cure silicone blend (C1) in a process comprising the steps of an additive manufacturing composition comprising:
   a) preparation of a 3D model of a preproduct;
   b) additive manufacturing of the preproduct according to the 3D model of the preproduct using an additive manufacturing device and an additive manufacturing composition comprising:
      i) at least one silicone building block bearing a plurality of alkenyl groups (A);
      ii) a crosslinking agent bearing a plurality of thiol groups (B);
      iii) at least one free radical photoinitiator (D), preferably in an amount in the range from 0.01 to 3.0 parts per weight, more preferably in the range from 0.1 to 2.0 parts per weight, relative to the total weight of silicone building blocks bearing a plurality of alkenyl groups;
   wherein the ratio of thiol groups to alkenyl groups in the composition is in the range from 0.5:1 to 5:1;
   c) post-curing treatment comprising a silanol condensation curing step, preferably consisting of exposing the preproduct to a relative humidity of greater than 20%, preferably of greater than 50%, for a time period in the range from 30 min to 72 h, preferably from 6 to 36 h;

wherein the condensation cure silicone blend (C1) is preferably present in the additive manufacturing composition of step b) in an amount in the range from 1 to 90 parts per weight, relative to the total weight of silicone building blocks bearing a plurality of alkenyl groups;

for the production of 3D-printed silicone having one of more of the following properties:
   a) a Young's modulus, measured according to ISO 37 on Type 4 tensile specimen, in the range from 110 to 10,000% of the Young's modulus of 3D-printed silicone produced from the same additive manufacturing composition in the absence of the condensation cure silicone blend (C1) or silanol condensation curing step,
   b) an elongation at break, measured according to ISO 37 on Type 4 tensile specimen, in the range from 110 to 1,000% of the elongation at break of 3D-printed silicone produced from the same additive manufacturing composition in the absence of the condensation cure silicone blend (C1) or silanol condensation curing step,
   c) a tensile strength, measured according to ISO 37 on Type 4 tensile specimen, in the range from 110 to 500% of the tensile strength of 3D-printed silicone produced from the same additive manufacturing composition in the absence of the condensation cure silicone blend (C1) or silanol condensation curing step,
   d) a tear strength, measured according to ASTM D624 on samples of specimen Type C, in the range from 110 to 400% of the tear strength of 3D-printed silicone produced from the same additive manufacturing composition in the absence of the condensation cure silicone blend (C1) or silanol condensation curing step,
   e) a Shore A hardness, measured according to ISO 7619-1, in the range from 110 to 2,500% of the Shore A hardness of 3D-printed silicone produced from the same additive manufacturing composition in the absence of the condensation cure silicone blend (C1) or silanol condensation curing step.

EXAMPLES

1. Determination Methods:

Young's Modulus

Young's Modulus is determined according to ISO 37 on Type 4 tensile specimen.

This specimen is obtained by:

a) printing an article according to the invention, b) if the article is thicker than 1 mm, the article is sliced into 1 mm thick sheets, c) punching a Type 4 tensile specimen from these 1 mm sheets.

In this way, the Young's Modulus at different points within the article can be gauged.

The measurements were made with a UTM equipped with a 100 N load cell, and the Young's Modulus was calculated between 10 and 50% elongation.

Tensile Strength

Tensile Strength was determined according to ISO 37 on Type 4 tensile specimen.

This specimen is obtained by:

a) printing an article according to the invention, b) if the article is thicker than 1 mm, the article is sliced into 1 mm thick sheets, c) punching a Type 4 tensile specimen from these 1 mm sheets.

In this way, the Tensile Strength at different points within the article can be gauged.

The measurements were made with a UTM equipped with a 100 N load cell.

Elongation at Break

Elongation at Break was determined according to ISO 37 on Type 4 tensile specimen. This specimen is obtained by:

a) printing an article according to the invention, b) if the article is thicker than 1 mm, the article is sliced into 1 mm thick sheets, c) punching a Type 4 tensile specimen from these 1 mm sheets.

In this way, the elongation at break at different points within the article can be gauged.

The measurements were made with a UTM equipped with a 100 N load cell.

Tear Strength

Tear Strength was determined according to ASTM D624 on Type C specimens. This specimen is obtained by:

a) printing an article according to the invention b) if the article is thicker than 2 mm, the article is sliced into 2 mm thick sheets c) punching a Type C specimen from these 2 mm sheets.

In this way the tear strength at different points within the article can be gauged.

The measurements were made with a UTM equipped with a 100 N load cell.

Shore A Hardness

Shore A hardness was determined according to ISO 7619-1. All tests were performed by a type A durometer. The measurements are made directly on printed samples of any size. To obtain Shore A hardness values for internal regions of articles, the articles are sliced at a predetermined height, with Shore A hardness measured in the centre of the cut face and at the edges of the cut face.

2. Experimental Results:

a) Preparation of 3D-Printed Silicone Comprising a Heat-Promoted Radical Curing Step

TABLE 1

Recipe for additive manufacturing composition 1

| Component | Amount (g) |
|---|---|
| A (includes 21 wt.-% pyrogenic silica) | 1000 |
| B | 35 |
| D | 120 |
| UV blocker | 2.5 |
| E | 10 |

A Silopren* U Base Compound P 300, commercially available from Momentive, and Polymer VS200, commercially available from Evonik, in a ratio of 100:35.
B (Mercaptopropyl)methylsiloxane-dimethylsiloxane copolymer (CAS: 101810-99-5) commercially available from GPC Silicones under the trade name GP-800.
D 2,2-Dimethoxy-2-phenylacetophenone (CAS: 24650-42-8), commercially available from Merck Sigma Aldrich.
UV blocker Avobenzone (CAS: 70356-09-1), commercially available from Merck Sigma Aldrich.
E 1-hydroxycyclohexyl phenyl ketone (CAS: 947-19-3), commercially available from Alfa Aesar.

Pre-Compounding: To the blend of component A with pyrogenic silica, component B was added and mixed with a saw tooth propeller at 2000 rpm for 10 min. Next, Component D and the UV blocker were dissolved in 5.0 mL of dichloromethane (DCM) and added to the silicone mixture. Then Component E was added to the mixture, which was mixed for a further 10 min.

Compounding: The mixed ink is passed through a 3-roll mill that operates at 600 rpm with slit widths of 30 μm and 5 μm respectively. The obtained 3D printing ink is then de-gassed in vacuo at 3 mbar for 15 min. The obtained 3D printing ink has a measured viscosity of 85 Pa*s.

3D Printing: The additive manufacturing composition was then used to print 3D-silicone articles, using a printer that uses a DLP light source (385 nm, 1-10 mW/cm$^2$). Each layer is exposed for 5 seconds (5-50 mW/cm$^2$ dosage).

Post-Curing: Post-curing is necessary to achieve the final mechanical properties and is performed inside a light chamber (385 nm, 20 mW/cm$^2$, 4 min) that ensures the printed object is exposed to light at all angles homogenously. Following the UV-curing step a second step is performed in an oven at 120° C. for 2 hours.

FIG. 1 shows the effect of heat curing in comparison to UV/Vis curing. A single cylindrical preproduct of diameter 10 mm and height 12 mm was printed according to the above procedure. Prior to the heat-curing step, the article was sliced into two cylindrical articles with diameter 10 mm and height 6 mm. One of these articles was tested for Shore A hardness on the cut face, whilst the other article was subjected to heat curing in an oven at 120° C. for 2 hours, before being tested for Shore A hardness on the cut face.

Three Shore A hardness measures were taken on the cut face of each of the articles, two measurements 1 mm away from the outer wall, and one measurement at the centre of the circular cut face.

As can be seen from FIG. 1, the Shore A hardness of the first article, which has only undergone UV curing is uneven, with higher values close to the outer wall and lower values at the centre of the cut face (which corresponds to the centre of the cured preproduct prior to slicing.

In contrast, the Shore A hardness values of the heat-cured article are much higher than those of the first article, and are also completely isotropic, with a value of A61 observed both at the centre and at the outer wall.

b) Comparison of Penetration Depth of UV Curing and Heat-Promoted Radical Curing In order to compare the efficiency of UV curing and heat-promoted radical curing, tubes of additive manufacturing composition were subjected to either UV and heat-promoted radical curing, or simply UV curing.

TABLE 2

Recipe for additive manufacturing composition 2

| Component | Amount (g) |
|---|---|
| A | 300 |
| B | 17.5 |
| D | 36 |
| UV blocker | 0.75 |
| E | 3 |
| Pigment | 1 |

A A blend of polysiloxane and silsesquioxane, commercially available from Evonik under the trade name VQM 973.
B (Mercaptopropyl)methylsiloxane-dimethylsiloxane copolymer (CAS: 101810-99-5) commercially available from GPC Silicones under the trade name GP-800.
D 2,2-Dimethoxy-2-phenylacetophenone (CAS: 24650-42-8), commercially available from Merck Sigma Aldrich.
UV blocker Avobenzene (CAS: 70356-09-1), commercially available from Merck Sigma Aldrich.
E 1-hydroxycyclohexyl phenyl ketone (CAS: 947-19-3), commercially available from Alfa Aesar.
Pigment Silc Pig ™ Blue, commercially available from Smooth-On Pre-Compounding: To component A, component B is added and mixed with a saw-tooth propeller at 2000 rpm for 10 min, Next, component D and the UB blocker were dissolved in 1.5 mL of dichloromethane (DCM) and added to the silicone mixture. Then, 3 g 2,5-Bis(tert-butylperoxy)-2,5-dimethylhexane and 1 g of Smooth-On Silc Pig™ Blue pigment was added to the mixture and mixed for additional 10 min.

Compounding: The silicone mixture is then passed through a 3-roll mill that operates at 600 rpm with slit widths of 30 μm and 5 μm respectively. The obtained 3D printing ink is then de-gassed in vacuo at 3 mbar for 15 min. The obtained 3D-printing ink has a measured viscosity of 250 Pa*s.

Moulding: The 3D printing ink was then moulded into a cylindrical shape by pouring it into a 50 mL Flacon tube. To remove any bubbles formed due to moulding, ink was centrifuged in the falcon tubes at 2000 rpm (650 cfm) for 1 min. 2 cylinders were moulded for comparison.

UV-Curing: Both inks were UV cured for 20 min in a UV chamber (385 nm, 20 mW/cm$^2$) under nitrogen atmosphere for 20 min on a rotating stage.

Heat Curing: After the UV-curing one sample was further cured at 180° C. for 20 min under normal atmosphere.

Testing: UV and heat cured samples were cut to obtain their cross-sections in order to observe depth of cure.

As can be seen from FIG. 2, the heat-cured samples are solid throughout, whereas the tube that only underwent UV curing has a liquid core, with only the outside few mm being cured.

For compositions prepared according to the present invention, the core area would not be completely liquid; however, the lack of curing in internal areas of the 3D-printed article would result in lower mechanical properties of this region, contributing to reduced mechanical performance for the entire article (see FIG. 1 for example).

c) Preparation of 3D-Printed Silicone Comprising a Silanol Condensation Step

TABLE 3

Recipe for additive manufacturing composition 3

| Component | Amount (g) |
|---|---|
| A | 900 |
| B | 30 |
| C1a | 140 |
| C1b | 10 |
| C2 | 20 |
| D | 10 |
| F | 5 |
| UV blocker | 2.5 |
| Silica | 40 |

A Silopren* U Base Compound P 1300, commercially available from Momentive, and Polymer RV100, commercially available from Evonik, in a ratio of 83:17.
B (Mercaptopropyl)methylsiloxane-dimethylsiloxane copolymer (CAS: 101810-99-5) commercially available from GPC Silicones under the trade name GP-800.
C1a Silanol terminated polysiloxane with a viscosity of 700 mPa*s (commercially available from Gelest Inc. under the name DMS-S27)
C1b Tetraethylorthosilicate (CAS: 78-10-4), commercially available from Merck Sigma Aldrich.
C2 Vinyltrimethoxysilane (CAS: 2768-02-7), commercially available from Merck Sigma Aldrich.
D 2,2-Dimethoxy-2-phenylacetophenone (CAS: 24650-42-8), commercially available from Merck Sigma Aldrich.
F Dimethylhydroxy(oleate)tin (CAS: 43136-18-1), commercially available from Gelest Inc.
UV blocker Avobenzene (CAS: 70356-09-1), commercially available from Merck Sigma Aldrich.
Silica Pyrogenic silica (Aerosil R8200, Evonik).

Pre-Compounding: To component A, component B was added and mixed with a saw tooth propeller at 2000 rpm for 10 min. Next, Component D, Component F and the UV blocker were dissolved in 5.0 mL of dichloromethane (DCM) and added to the silicone mixture, forming Component Blend 1, which was stirred for 5 minutes.

In a separate step, components Cla, C1b, C2 and the silica are mixed in a planetary mixer with a disperser bead spinning at the tip speed of 10 m/s and run through a 3 roll mill operating with slid widths of 30 μm and 5 μm and a speed of 600 rpm yielding a 3d printing silicone ink with a viscosity of 250 Pa·s to form Component Blend 2, which was stirred for 5 minutes. The mixing and storage are done under dry and inert conditions.

Component Blend 1 and Component Blend 2 were mixed together in a planetary mixer with a disperser head spinning at the tip speed of 10 m/s, prior to compounding.

Compounding: The mixed ink is passed through a 3-roll mill that operates at 600 rpm with slit widths of 30 μm and 5 μm respectively. The obtained 3D printing ink is then de-gassed in vacuo at 3 mbar for 15 min. The obtained 3D printing ink had a measured viscosity of 250 Pa*s.

3D Printing: The additive manufacturing composition was then used to print 3D-silicone articles, using a printer that uses a DLP light source (385 nm, 1-10 mW/cm$^2$). Each layer is exposed for 5 seconds (5-50 mW/cm$^2$ dosage).

Post-Curing: Post-curing is necessary to achieve the final mechanical properties and is performed inside a light chamber (385 nm, 20 mW/cm$^2$, 4 min) that ensures the printed object is exposed to light at all angles homogenously. Following the UV-curing step a second step is performed in an oven at 60° C. for 24 hours at a controlled relative humidity of 50%.

FIG. 3 shows an ear-shaped prosthesis manufactured using additive manufacturing composition 3. As can be seen, extremely high resolution of a highly detailed shape can be achieved with the inventive method.

Relative to analogous additive manufacturing compositions having higher amounts of the Component Blend 2/lower amounts of Component Blend 1, the mechanical properties are notably improved. Likewise, when compared to an analogous additive manufacturing composition omitting component C2, the links between the two networks lead to improved mechanical properties and stability. In particular, improved tear strength, tensile strength and tensile modulus are exhibited.

The invention claimed is:

1. A method for preparing a 3D-printed silicone comprising:

a) preparation of a 3D model of a preproduct;

b) additive manufacturing of the preproduct according to the 3D model of the preproduct using an additive manufacturing device and an additive manufacturing composition comprising:

i) at least one silicone building block bearing a plurality of alkenyl groups (A);

ii) at least one crosslinking agent bearing a plurality of thiol groups (B);

iii) at least one free radical photoinitiator (D);

iv) a thermally activatable free radical initiator (E);

c) post-curing treatment that comprises at least one further curing step other than light-promoted curing, wherein the at least one further curing step is a heat promoted radical curing step;

wherein the ratio of thiol groups to alkenyl groups in the additive manufacturing composition is in the range from 0.5:1 to 5:1.

2. The method according to claim 1, wherein the at least one silicone building block bearing a plurality of alkenyl groups (A) and the crosslinking agent bearing a plurality of thiol groups (B) form a stable emulsion.

3. The method according to claim 1, wherein the at least one crosslinking agent bearing a plurality of thiol groups (B) is described by formula (I):

$$R^1(R)_2SiO((R^3R)SiO)_xSi(R)_2R^2 \quad (I)$$

wherein R is independently C (1-12)alkyl;

$R^1$, $R^2$, $R^3$ are independently C (1-12)alkyl;

wherein each instance of $R^3$ may be the same or different; and x is 1 or more, with the proviso that at least one of $R^1$, $R^2$, $R^3$ is mercapto-C(1-12)alkyl.

4. The method according to claim 1, wherein the additive manufacturing composition further comprises:

v) a shear thinning filler in an amount in the range from 1 to 60 parts per weight, relative to the total weight of the silicone building blocks bearing a plurality of alkenyl groups.

5. The method according to claim 1, wherein the at least one free radical photoinitiator (D) is present in an amount in the range from 0.01 to 3.0 parts per weight, relative to the total weight of silicone building blocks bearing a plurality of alkenyl groups.

6. The method according to claim 1, wherein the heat promoted radical curing step consists of heating the preproduct at a constant temperature in the range from 30° C. to 200° C. for a time period in the range from 1 second to 24 h.

7. The method according to claim 1, wherein the thermally activatable free radical initiator I is selected from diazo compounds and peroxides.

8. The method according to claim 1, wherein the additive manufacturing composition further comprises:

vi) a condensation cure silicone blend (C1); and wherein the at least one further curing step of step c) is a silanol condensation curing step, and wherein the condensation cure silicone blend (C1) is a blend of condensation cure silicone building blocks (C1a) and silanol crosslinkers (C1b).

9. The method according to claim 8, wherein the silanol condensation curing step consists of exposing the preproduct to a relative humidity of greater than 20% for a time period in the range from 30 min to 72 h.

10. The method according to claim 8, wherein the ratio of crosslinker groups to silanol groups of the condensation cure silicone building blocks (C1a) in the additive manufacturing composition is in the range from 0.5:1 to 50:1.

11. The method according to claim 8, wherein the additive manufacturing composition further comprises:

vii) an alkenyl silane coupling agent (C2) described by formula (Iva):

$$(R')_mSi(R'')_nR \quad (Iva)$$

wherein R is a vinyl, allyl, butenyl or pentenyl group;

wherein R' may be any group capable of behaving as a leaving group in a silanol condensation reaction;

R" is selected from C (1-6)alkyl and C (1-6)alkenyl; and wherein m is either 2 or 3, n is either 0 or 1 and m+n=3; and/or viii) thiol-containing silane coupling agent (C3) described by formula (Va):

$$(R^a)_mSi(R^b)_nR \quad (Va)$$

wherein R is a mercapto-C(1-12)alkyl;

wherein $R^a$ may be any group capable of behaving as a leaving group in a silanol condensation reaction;

$R^b$ is selected from C (1-6)alkyl and C (1-6)alkenyl; and wherein m is either 2 or 3, n is either 0 or 1 and m+n=3.

12. The method according to claim 8, wherein the additive manufacturing composition further comprises:

ix) a silanol condensation catalyst (F).

13. The method according to claim 1, wherein step c) comprises both a heat promoted radical curing step and a silanol condensation curing step, the heat promoted radical curing step and silanol condensation curing step being carried out either separately or simultaneously, wherein if the heat promoted radical curing step and silanol condensation curing step are carried out simultaneously, the combined heating/silanol condensation curing step consists of heating of the preproduct at a constant temperature in the range from 40° C. to 200° C. for a time period in the range from 1 min to 24 h at a relative humidity of greater than 50%.

* * * * *